US008400992B2

(12) United States Patent
Liang et al.

(10) Patent No.: US 8,400,992 B2
(45) Date of Patent: Mar. 19, 2013

(54) CALL SETUP METHOD FOR MOBILE VIRTUAL PRIVATE NETWORK AND ACCESS POINT APPARATUS THEREOF

(75) Inventors: Ching-Feng Liang, Hsinchu County (TW); Yi-Bing Lin, Hsinchu County (TW); Chai-Hien Gan, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/563,749

(22) Filed: Aug. 1, 2012

(65) Prior Publication Data

US 2012/0295599 A1 Nov. 22, 2012

Related U.S. Application Data

(62) Division of application No. 12/687,889, filed on Jan. 15, 2010, now Pat. No. 8,300,580.

(30) Foreign Application Priority Data

Aug. 24, 2009 (TW) .............................. 98128394 A

(51) Int. Cl.
*H04W 8/02* (2009.01)
*H04W 12/06* (2009.01)
*H04L 12/66* (2006.01)
*H04M 3/42* (2006.01)

(52) U.S. Cl. ........ 370/338; 370/328; 370/352; 370/331; 370/401; 455/414.1; 455/435.1; 455/445

(58) Field of Classification Search .................. 370/328, 370/329, 338, 352, 353–356, 238, 401; 455/414.1, 455/414.2, 422.1, 435.1, 436, 437–439, 440, 455/445, 434

See application file for complete search history.

(56) References Cited

U.S. PATENT DOCUMENTS

| | | | | |
|---|---|---|---|---|
| 5,881,235 | A * | 3/1999 | Mills | 709/221 |
| 7,155,211 | B2 * | 12/2006 | Mun et al. | 455/415 |
| 7,161,933 | B2 * | 1/2007 | Stanford | 370/352 |
| 7,460,521 | B2 * | 12/2008 | Son | 370/352 |
| 7,929,953 | B2 * | 4/2011 | Jiang | 455/414.1 |
| 2002/0037712 | A1 * | 3/2002 | Shin | 455/414 |
| 2004/0160931 | A1 * | 8/2004 | Lee et al. | 370/338 |
| 2006/0159039 | A1 * | 7/2006 | Jung et al. | 370/316 |
| 2008/0139173 | A1 * | 6/2008 | Yokobori et al. | 455/411 |

FOREIGN PATENT DOCUMENTS

| | | |
|---|---|---|
| TW | 200412169 | 7/2004 |
| TW | 200524333 | 7/2005 |

OTHER PUBLICATIONS

"Office Action of Taiwan counterpart application" issued on Jan. 9, 2013, p1-p7, in which the listed references were cited.

* cited by examiner

*Primary Examiner* — Kwang B Yao
*Assistant Examiner* — Candal Elpenord
(74) *Attorney, Agent, or Firm* — Jianq Chyun IP Office

(57) ABSTRACT

A call setup method is provided for a MVPN which includes at least one access point apparatus, at least one database, and a plurality of users. The database records a private extension number, a user phone number, and a user identity module of each user and a link address of the corresponding access point apparatus. The access point apparatus corresponding to a MO user receives a call setup request message for setting up a call with a MT user from the MO user. The access point apparatus corresponding to the MO user determines whether the link address of the access point apparatus corresponding to the MT user is valid according to the database. If the link address of the access point apparatus corresponding to the MT user is valid, the MO user and the MT user set up the call through the access point apparatuses corresponding to the link addresses.

8 Claims, 15 Drawing Sheets

CALL SETUP METHOD FOR MOBILE VIRTUAL PRIVATE NETWORK AND ACCESS POINT APPARATUS THEREOF

CROSS-REFERENCE TO RELATED APPLICATION

This application is a Divisional of and claims the priority benefit of U.S. patent application Ser. No. 12/687,889, filed on Jan. 15, 2010, now pending, which claims the priority benefits of Taiwan application Serial No. 98128394, filed on Aug. 24, 2009. The entirety of each of the above-mentioned patent applications is hereby incorporated by reference herein and made a part of this specification.

BACKGROUND

1. Technical Field

The disclosure generally relates to a mobile virtual private network (MVPN) system, and more particularly, to a call setup method for a MVPN and an access point apparatus thereof.

2. Description of Related Art

Most telephone calls made over mobile communication within an enterprise are made indoors. However, in recent years, mobile network providers have stopped setting up new base stations or may even remove existing base stations due to the increasing concern over our environment, which causes serious deficiency of indoor coverage and communication capacity in mobile communication.

Presently, the indoor access point apparatus technique or the femtocell technique is adopted for resolving the problem of deficient indoor coverage and communication capacity. A mobile virtual private network (MVPN) system can be adopted to deal with the situation that most telephone calls made over mobile communication within an enterprise are made indoors. The MVPN system allows a user to receive an incoming call by using his mobile phone when an internal caller dials an internal extension number of the user. However, in a conventional MVPN system, all the resources for setting up calls and providing call services (for example, the radio resources of base stations, the bandwidth resources of the backbone network, and related mobile add-ons equipments, etc) are provided by the mobile communication provider. Thus, the setup and running cost of the MVPN system is very high.

SUMMARY

Consistent with the disclosed embodiments, there is provided different call setup methods adaptable to a mobile virtual private network (MVPN) and access point apparatuses using the same, wherein the network resources of an enterprise are used to effectively resolve the problem of deficient indoor coverage and communication capacity of base stations of a mobile network provider so that the resource cost of the mobile network provider is reduced and the performance and quality of call setup are improved.

Consistent with the disclosed embodiments, there is provided a call setup method adaptable to a MVPN. The MVPN includes at least one access point apparatus, at least one database, and a plurality of users. The database records a private extension number, a user phone number, and a user identity module of each user and a link address of the corresponding access point apparatus. The users include a MO user and a MT user. The call setup method includes following steps. First, the access point apparatus corresponding to the MO user receives a call setup request message for setting up a call with the MT user from the MO user. Then, the access point apparatus corresponding to the MO user updates the link address of the access point apparatus corresponding to the MO user in the database. Next, the access point apparatus corresponding to the MO user connects to a public land mobile network (PLMN) and records a user phone number of the MO user and a user phone number of the MT user, and the MO user and the MT user set up the call through the PLMN. If the access point apparatus corresponding to the MO user receives a call setup request message from the PLMN, it determines whether the received user phone number of the MO user and the received user phone number of the MT user are the same as those it stores. If the received user phone number of the MO user and the received user phone number of the MT user are the same as those stored in the access point apparatus corresponding to the MO user stores, the access point apparatus corresponding to the MO user cancels the call set up through the PLMN, and the MO user and the MT user set up the call through the access point apparatus corresponding to the MT user and the access point apparatus corresponding to the MO user.

Consistent with the disclosed embodiments, there is provided a MO access point apparatus adaptable to a MVPN. The MVPN includes a MO user, a MT user, and a database. The database records a private extension number, a user phone number, and a user identity module of each user and a link address of the corresponding MO access point apparatus. The MO access point apparatus receives a call setup request message for setting up a call with the MT user from the MO user. Then, the MO access point apparatus determines whether the link address of a MT access point apparatus corresponding to the MT user is valid according to the database. If the link address of the MT access point apparatus corresponding to the MT user is valid, the MO user and the MT user set up the call through the MO access point apparatus and the MT access point apparatus.

Consistent with the disclosed embodiments, there is provided a MT access point apparatus adaptable to a MVPN. The MVPN includes a MO user and a database. The database records a private extension number, a user phone number, and a user identity module of the MO user and a link address of a corresponding MO access point apparatus. The database also records a private extension number, a user phone number, and a user identity module of a MT user and a link address of the corresponding MT access point apparatus. The MT access point apparatus receives a call setup request message for setting up a call between the MO user and the MT user from the MO access point apparatus corresponding to the MO user. If the MT user is within the coverage area of the MT access point apparatus, the MO user and the MT user set up the call through the MO access point apparatus and the MT access point apparatus.

Consistent with the disclosed embodiments, there is provided a MO access point apparatus adaptable to a MVPN. The MVPN includes a plurality of users and a database. The users include a MO user and a MT user. The database records a private extension number, a user phone number, and a user identity module of each user, a link address of a MT access point apparatus, and a link address and identity information of a MO access point apparatus. The MO access point apparatus receives a call setup request message for setting up a call with the MT user from the MO user. Then, the MO access point apparatus searches for the private extension number or the user phone number of the MT user in the database. If the private extension number or the user phone number of the MT user is in the database, the MO access point apparatus inquires the MT access point apparatus whether the MT user is within the coverage area of the MT access point apparatus. If the MT user is within the coverage area of the MT access point apparatus, the MT user responds an inquiry result to the MO access point apparatus through the MT access point apparatus, and the MO user and the MT user set up the call through the MO access point apparatus and the MT access point apparatus.

Consistent with the disclosed embodiments, there is provided a MT access point apparatus adaptable to a MVPN. The MVPN includes a plurality of users and a database. The users include a MO user and a MT user. The database records a private extension number, a user phone number, and a user identity module of each user, a link address and identity information of a MT access point apparatus, and a link address and identity information of a MO access point apparatus. The MT access point apparatus receives a call setup request message for setting up a call between the MO user and the MT user from the MO access point apparatus corresponding to the MO user. If the MT user is within the coverage area of the MT access point apparatus, the MT user responds an inquiry result to the MO access point apparatus corresponding to the MO user through the MT access point apparatus, and the MO user and the MT user set up the call through the MO access point apparatus and the MT access point apparatus.

Consistent with the disclosed embodiments, there is provided a MO access point apparatus adaptable to a MVPN. The MVPN includes a MO user, a MT user, and a database. The database records a private extension number, a user phone number, and a user identity module of the MO user and a link address of a corresponding MO access point apparatus, and the database also records a private extension number, a user phone number, and a user identity module of the MT user and a link address of a corresponding MT access point apparatus. The MO access point apparatus receives a call setup request message for setting up a call with the MT user from the MO user. Then, the MO access point apparatus updates the link address of the MO access point apparatus in the database. Next, the MO access point apparatus connects to a PLMN and records the user phone number of the MO user and the user phone number of the MT user. The MO user and the MT user set up the call through the PLMN. If the MO access point apparatus receives a call setup request message from the PLMN, the MO access point apparatus determines whether the received user phone number of the MO user and the received user phone number of the MT user are the same as those it stores. If the received user phone number of the MO user and the received user phone number of the MT user are the same as those stored in the MO access point apparatus stores, the MO access point apparatus cancels the call set up through the PLMN, and the MO user and the MT user set up the call through the MO access point apparatus and the MT access point apparatus.

Consistent with the disclosed embodiments, there is provided a MT access point apparatus adaptable to a MVPN. The MVPN includes a MO user, a MT user, and a database. The database records a private extension number, a user phone number, and a user identity module of the MO user and a link address of a corresponding MO access point apparatus, and the database also records a private extension number, a user phone number, and a user identity module of the MT user and a link address of the corresponding MT access point apparatus. The MT access point apparatus receives a call setup request message for setting up a call between the MO user and the MT user, a user phone number of the MO user, and a user phone number of the MT user from a PLMN and records the user phone number of the MO user and the user phone number of the MT user. Then, the MT access point apparatus searches for the user phone number of the MO user in the database and determines whether the link address of the MO access point apparatus corresponding to the MO user is valid. If the user phone number of the MO user is in the database and the link address of the MO access point apparatus corresponding to the MO user is valid, the MT access point apparatus indicates the database to send the user phone number of the MO user, the user phone number of the MT user, and the link address of the MT access point apparatus corresponding to the MT user to the MO access point apparatus corresponding to the MO user.

As described above, different call setup methods adaptable to a MVPN and access point apparatuses using these methods are provided in exemplary embodiments of the present disclosure, wherein the network resources of an enterprise are effectively used to resolve the problem of deficient indoor coverage and communication capacity of base stations of a mobile network provider without changing the existing structure and call setup procedure of the MVPN and the existing functions of mobile phones, so that the resource cost of the mobile network provider is reduced and the performance and quality of call setup are improved.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to exemplary embodiments, examples of which are illustrated in the accompanying drawings. The following description refers to the accompanying drawings, and the same numbers in different drawings represent the same or similar elements unless otherwise represented.

Consistent with the disclosed embodiments, there is provided different call setup methods adaptable to a mobile virtual private network (MVPN) and access point apparatuses using these call setup methods.

Figure 1:
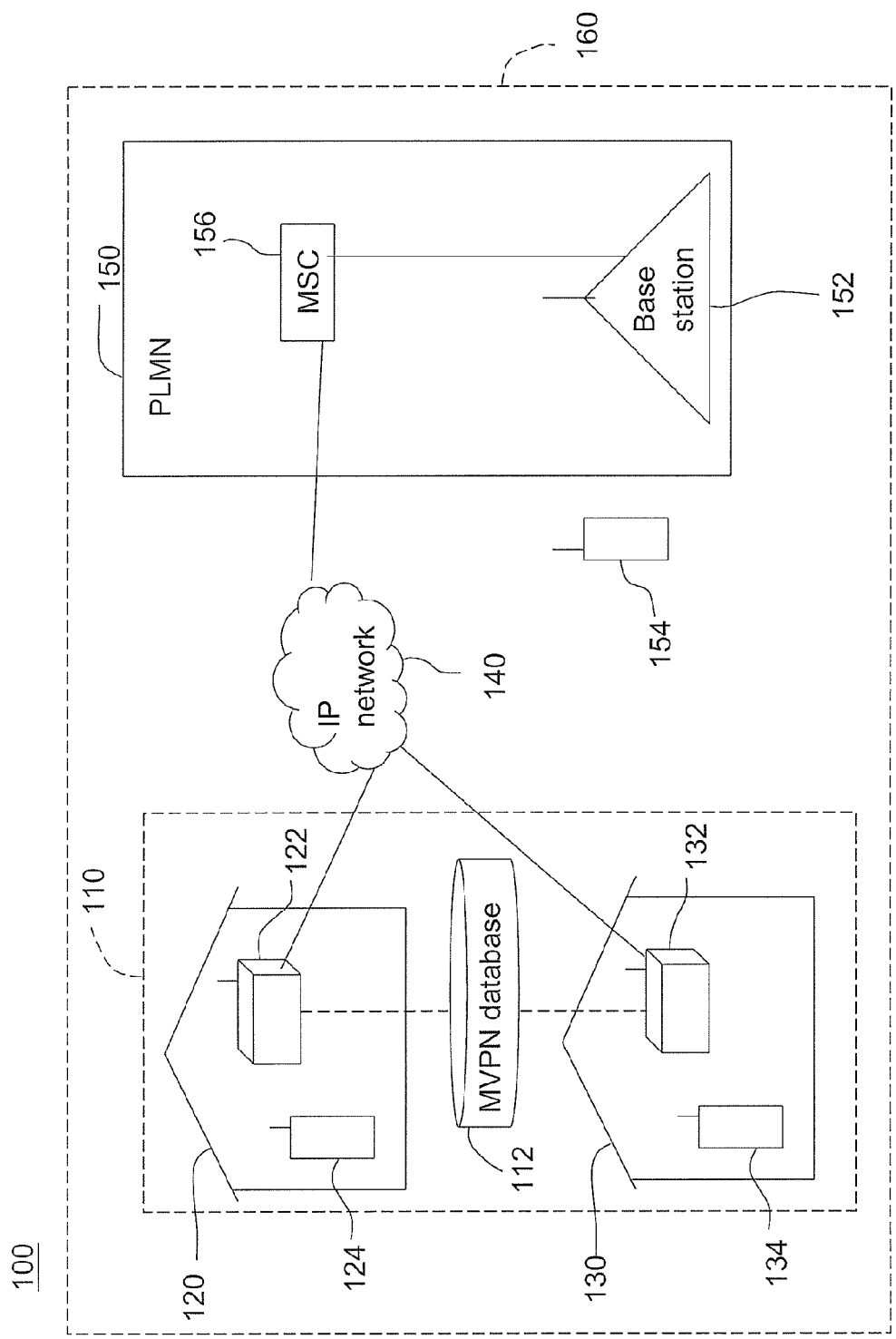
FIG. 1 is a diagram of a network system 100 according to an exemplary embodiment consistent with the present disclosure.

FIG. 1 is a diagram of a MVPN system 100 according to an exemplary embodiment consistent with the present disclosure. Referring to FIG. 1, the MVPN system 100 includes a MVPN 110, an internet protocol data network (IP network) 140, and a public land mobile network (PLMN) 150. The IP network 140 is coupled to the MVPN 110 and the PLMN 150. The PLMN 150 includes at least one base station 152, at least one mobile phone 154, and at least one mobile switching center (MSC) 156. The dotted line 160 in FIG. 1 indicates the wireless communication service coverage area of the base station 152. The base station 152 cannot provide a stable wireless communication service to mobile phone users outside the wireless communication service coverage area. Besides, some mobile phone users cannot receive the wireless communication service if the number of mobile phone users served by the base station 152 or the quantity of data transmitted exceeds the system capacity of the base station 152. Thus, the MVPN 110 is deployed for serving internal users of an enterprise. The exemplary embodiment described above is only an example but not intended to limit the present disclosure. The PLMN 150 may also include multiple base stations, and each of the base stations provides the wireless communication service to a plurality of mobile phone users. In addition, the MSC 156 is connected to at least the base station 152 and may also be connected to multiple base stations.

The MVPN 110 is connected to the IP network 140 via access point apparatuses 122 and 132 through wired or wireless transmission. For example, the MVPN 110 may be connected to the IP network 140 through an asymmetric digital subscriber line (ADSL), or the MVPN 110 may also be connected to the IP network 140 through a wireless network conforming to the IEEE 802.16d communication protocol. Similar to the MVPN 110, the PLMN 150 is also coupled to the IP network 140 through wired or wireless transmission. However, the MVPN 110 and the PLMN 150 may be coupled to the IP network 140 through different methods. Besides, the MVPN 110 may be coupled to the MSC 156 first and then connected to the base station 152.

Referring to FIG. 1 again, the MVPN 110 is deployed within enterprise buildings 120 and 130 for providing a MVPN voice service to both mobile phones and internal extensions within the enterprise. The MVPN voice service allows a mobile termination (MT) user to receive an incoming call with his mobile phone when an internal user of the enterprise dials an internal extension number of the MT user. Besides, the MVPN voice service also allows a call to be set up through the access point apparatuses within the enterprise buildings when an external user dials a mobile phone number.

The MVPN 110 includes a MVPN database 112, access point apparatuses 122 and 132, and mobile phones 124 and 134. Within the building 120, the MVPN 110 provides the MVPN service to the mobile phone 124 through the access point apparatus 122. Within the building 130, the MVPN 110 provides the MVPN service to the mobile phone 134 through the access point apparatus 132. The embodiment described above is only an example but not intended to limit the present disclosure. In other exemplary embodiments consistent with the present disclosure, the MVPN 110 may also include more than two enterprise buildings, each building may have more than two MVPN databases, and each building may have more than 2 access point apparatuses and more than 2 mobile phones. To be more specific, in the exemplary embodiment described above, the MVPN 110 is composed of more than 2 access point apparatuses 122 and 132. However, the number of the access point apparatuses is not limited in the present disclosure, and the call setup method provided by exemplary embodiments consistent with the present disclosure is still applicable if there is only one access point apparatus. In addition, in another exemplary embodiment, the MVPN database 112 is served as a gateway, and the MVPN 110 is connected to the external IP network 140 through this MVPN database 112.

Referring to FIG. 1 again, within the building 120 and 130, the access point apparatus 122 provides the MVPN service to the mobile phone 124 through wireless transmission. Same as the access point apparatus 122, the access point apparatus 132 provides the MVPN service to the mobile phone 134 through wireless transmission. In the present exemplary embodiment, the access point apparatuses 122 and 132 may be internet protocol multimedia subsystem-based (IMS-based) femto-cells. Besides, the wireless connection between the access point apparatuses 122 and 132 and the mobile phones 124 and 134 is the same as that the base station 152 of the PLMN 150 provides to the mobile phone 154. For example, the access point apparatus 122 and the base station 152 of the PLMN 150 can provide wireless communication service to the mobile phone 124, 134, or 154 through the wireless transmission of a global system for mobile communications (GSM) system. The embodiment described above is only an example but not intended to limit the present disclosure, and the access point apparatuses 122 and 132 and the base station 152 of the PLMN 150 may also adopt other wireless transmission techniques, such as the wireless access technique of a wideband code division multiple access (WCDMA) system or a worldwide interoperability for microwave access (WiMAX) system. Besides, in other exemplary embodiments, the access point apparatuses 122 and 132 may not be IMS-based femtocells but femtocells working in other communication systems.

Referring to FIG. 1 again, the MVPN database 112 of the MVPN 110 is connected to the access point apparatuses 122 and 132 through wired or wireless transmission. For example, the MVPN database 112 can be connected to the access point apparatuses 122 and 132 through an Ethernet or through a wireless transmission technique conforming to the IEEE 802.11n communication protocol. In short, the embodiment described above is only an example but not intended to limit the present disclosure, and the MVPN database 112 may also be coupled to the access point apparatuses 122 and 132 through other wired or wireless transmission techniques. Below, different call setup methods and access point apparatuses using the same provided by exemplary embodiments consistent with the present disclosure will be described in detail.

First Exemplary Embodiment

Figure 2:
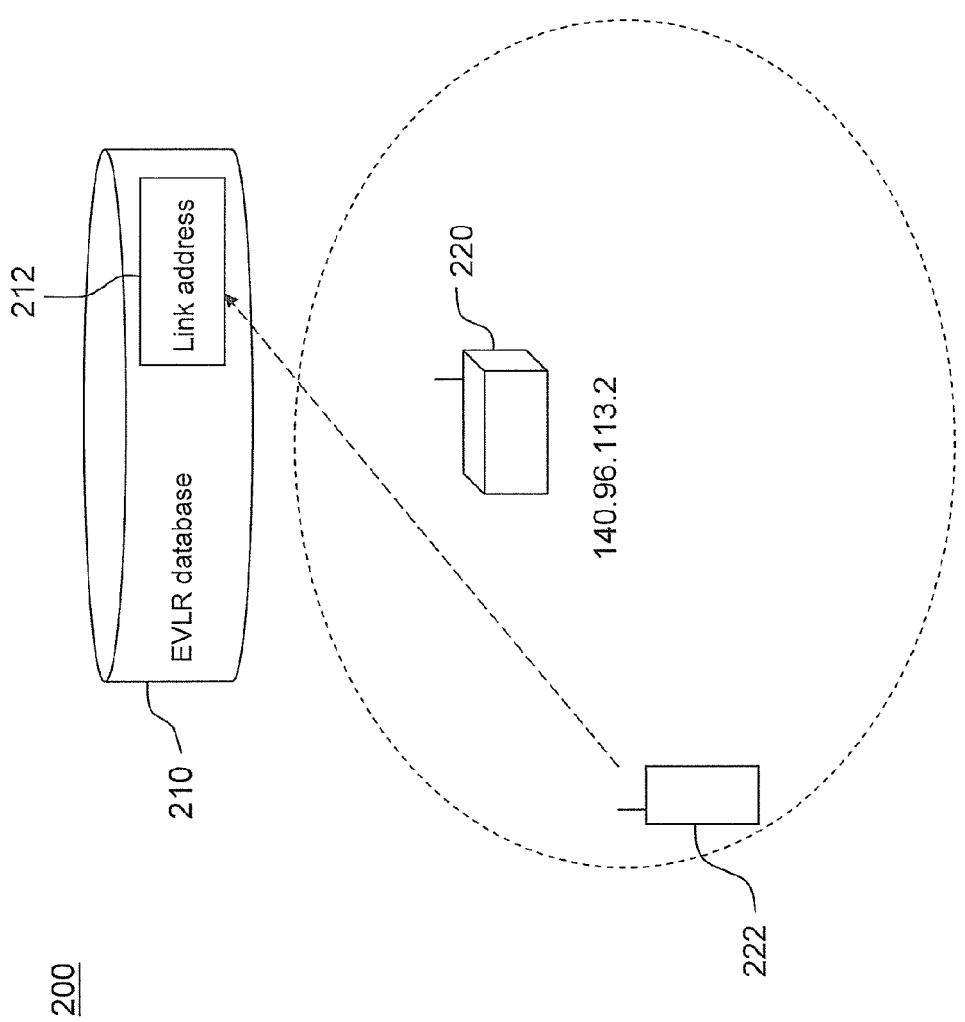
FIG. 2 is a diagram of a mobile virtual private network (MVPN) operating environment 200 according to a first exemplary embodiment consistent with the present disclosure.

FIG. 2 is a diagram of a MVPN operating environment 200 according to the first exemplary embodiment consistent with the present disclosure. Referring to both FIG. 1 and FIG. 2, the MVPN operating environment 200 works in the enterprise building 120 or the enterprise building 130 illustrated in FIG. 1, and the MVPN operating environment 200 includes at least one enterprise visited location registrar (EVLR) database 210, at least one access point apparatus 220, and a mobile phone 222. The wireless connection between the access point apparatus 220 and the mobile phone 222 is similar to that between the access point apparatus 122 and the mobile phone 124 in the exemplary embodiment illustrated in FIG. 1. The embodiment described above is only an example but not intended to limit the present disclosure, and the MVPN operating environment 200 may also include more than 2 mobile phone users.

Referring to FIG. 2 again, the EVLR database 210 records a user identity module (not shown), a user phone number, and a private extension number of each mobile phone in the enterprise and a link address of the corresponding access point apparatus. The user identity module contains an international mobile subscriber identity (IMSI). In the present exemplary embodiment, the link address is an internet protocol (IP) address. For example, as shown in FIG. 2, the digits "140.96.113.2" beside the access point apparatus 220 is the IP address (i.e., the link address) of the access point apparatus 220.

Referring to FIG. 1 and FIG. 2 again, the IMSI of each user identity module is stored in a subscriber identity module (SIM) card of an internal user's mobile phone, and the IMSI, the user phone number, and the private extension number are stored in the EVLR database 210 in advance. Additionally, in the present exemplary embodiment, the EVLR database 210 is an independent database server. In other exemplary embodiments, the EVLR database 210 may be integrated with the MVPN database as shown in FIG. 1 or distributed in the access point apparatuses of the MVPN 110. If the EVLR database 210 is distributed in the access point apparatuses of the MVPN 110, each access point apparatus updates the content in the database thereof through a message exchange manner so as to synchronize the data in the EVLR database 210. For example, each access point apparatus may update the content in the EVLR database 210 thereof through the message exchange manner at intervals of 3 seconds. Each access point apparatus may also update the content in the EVLR database 210 thereof through the message exchange maaner every time when the mobile phone user enters or leaves the wireless communication service coverage area of the MVPN 110.

In the present exemplary embodiment, the dotted line around the access point apparatus 220 in FIG. 2 indicates the wireless communication service coverage area of the access point apparatus 220. When the mobile phone of an internal user is turned on and the user enters or leaves the wireless communication service coverage area of the access point apparatus 220, the access point apparatus 220 updates the link address of the corresponding access point apparatus of the mobile phone in the EVLR database 210. For example, when the mobile phone 222 is turned on and just enters the wireless communication service coverage area of the access point apparatus 220, the access point apparatus 220 updates the link address of the user identity module of the mobile phone 222 in the EVLR database 210 as "140.96.1132". Herein the link address of the user identity module of the mobile phone 222 is valid. In addition, when the mobile phone 232 is turned on and just leaves the wireless communication service coverage area of the access point apparatus 220, the access point apparatus 220 sets the link address of the user identity module of the mobile phone 222 in the EVLR database 210 as invalid. When a mobile phone is outside the wireless communication service coverage areas of all the access point apparatuses of the MVPN 110, the link address of the access point apparatus corresponding to the user identity module of the mobile phone in the EVLR database 210 is invalid. Herein the mobile phone can only make phone calls through base stations (not shown) of a PLMN (not shown) provided by a mobile network provider.

Figure 3:
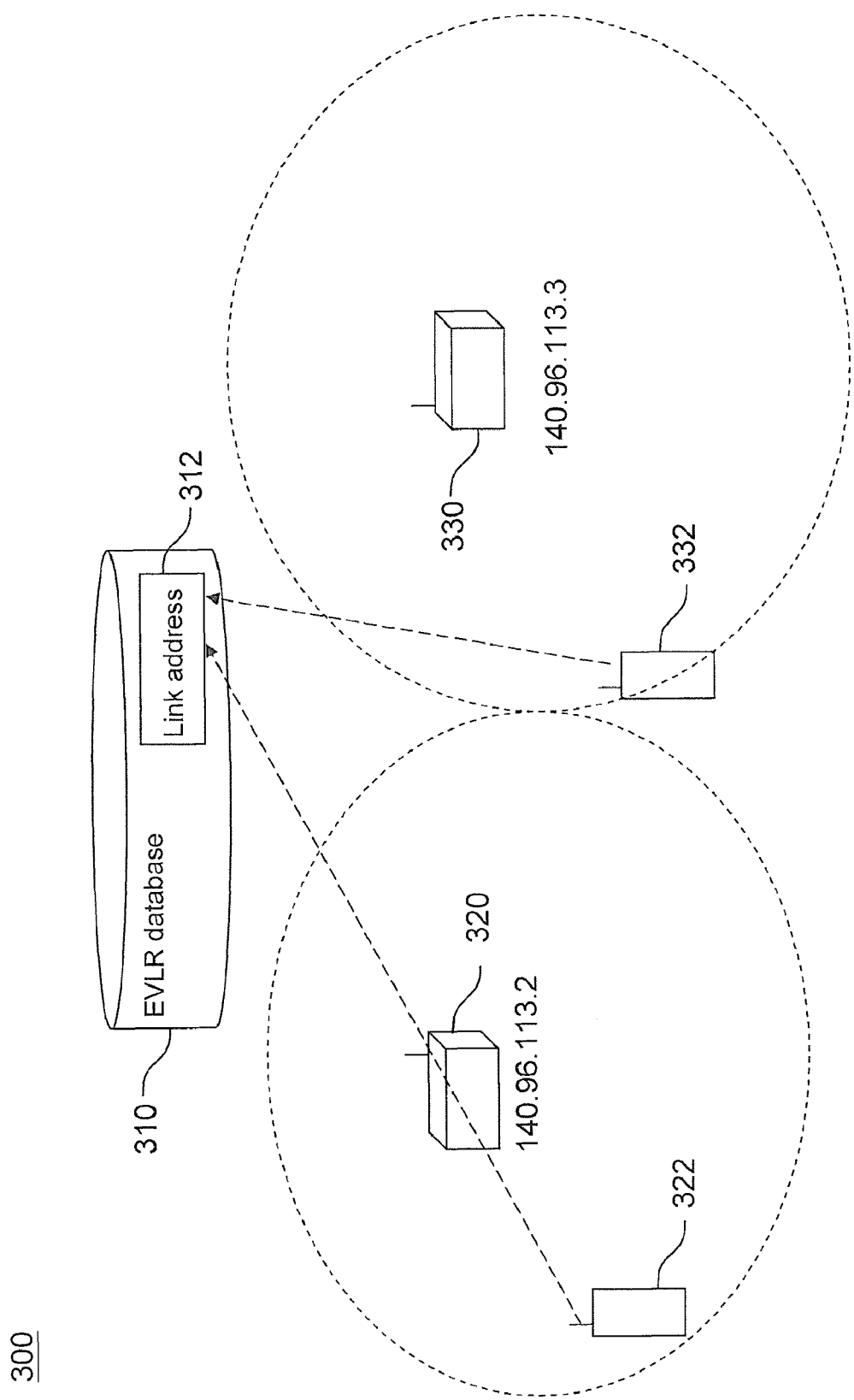
FIG. 3 is a diagram of a MVPN operating environment 300 according to the first exemplary embodiment consistent with the present disclosure.

FIG. 3 is a diagram of a MVPN operating environment 300 according to the first exemplary embodiment consistent with the present disclosure. Referring to both FIG. 1 and FIG. 3, when the mobile phone of an internal user is turned on and the internal user leaves the wireless communication service coverage area of an access point apparatus but at the same time, enters the wireless communication service coverage area of another access point apparatus, the new access point apparatus updates the link address of the corresponding access point apparatus of the mobile phone in the EVLR database 310. For example, a mobile phone is originally at the position of the mobile phone 322 as shown in FIG. 3, and the link address of the corresponding access point apparatus in the EVLR database 310 is updated from the access point apparatus 320 to "140.96.113.2". However, if the mobile phone moves to the position of the mobile phone 332 as shown in FIG. 3, the access point apparatus 320 updates the link address of the corresponding access point apparatus in the EVLR database 310 to "140.96.113.3".

Referring to FIG. 1 and FIG. 3 again, when the mobile phone 322 is turned on within the wireless communication service coverage area of the corresponding access point apparatus 320, the mobile phone 322 performs a register procedure on the EVLR database 310, and the EVLR database 310 updates the link address of the access point apparatus corresponding to the mobile phone 322 through the register procedure.

Referring to FIG. 1 and FIG. 3 again, when the mobile phone 322 is already turned on but no call has been set up, if the mobile phone 322 enters the wireless communication service coverage area of any access point apparatus of the MVPN 110 from another place, the mobile phone 322 performs an update procedure on the EVLR database 310, and the EVLR database 310 updates the link address of the access point apparatus corresponding to the mobile phone 322 through the update procedure.

Referring to FIG. 1 and FIG. 3 again, when the mobile phone 322 is already turned on and a call has been set up, if the mobile phone 322 enters the wireless communication service coverage area of the access point apparatus 320, the mobile phone 322 performs a handover procedure on the EVLR database 310, and the EVLR database 310 updates the link address of the access point apparatus corresponding to the mobile phone 322 through the handover procedure.

Referring to FIG. 1 and FIG. 3 again, when the mobile phone 322 is turned off within the wireless communication service coverage area of the corresponding access point apparatus, the mobile phone 322 performs a detach procedure on the EVLR database 310, and the EVLR database 310 sets the link address of the access point apparatus corresponding to the mobile phone 322 as invalid through the detach procedure.

Referring to FIG. 1 and FIG. 3 again, when the mobile phone 322 is not turned off within the wireless communication service coverage area of the corresponding access point apparatus but the user leaves the wireless communication service coverage areas of all the access point apparatuses of the MVPN 110, the mobile phone 322 performs an update procedure on the EVLR database 310, and the EVLR database 310 sets the link address of the access point apparatus corresponding to the mobile phone 322 as invalid. Below, how the call setup method in the present exemplary embodiment works in the network system 100 illustrated in FIG. 1 will be described with reference to FIG. 4.

Referring to FIG. 1 and FIG. 3 again, when a mobile origination (MO) user (the mobile phone 322) calls a MT user (the mobile phone 332) within the wireless communication service coverage area of the corresponding access point apparatus 320, the access point apparatus 320 determines whether the MT user (the mobile phone 332) is within the wireless communication service coverage area of any access point apparatus of the MVPN 110 according to the EVLR database 310. If the mobile phone 332 is within the wireless communication service coverage area of any access point apparatus (for example, the access point apparatus 330), the subsequent call setup procedure is handed over to the access point apparatuses 320 and 330. If the mobile phone 332 is not within the wireless communication service coverage area of any access point apparatus, the subsequent call setup procedure is handed over to the MSC 156 of the PLMN 150 and the access point apparatus 320. In addition, it should be mentioned that if the mobile phone 332 is within the wireless communication service coverage area of the access point apparatus 320, the subsequent call setup procedure is carried out by only the access point apparatus 320.

Figure 4:
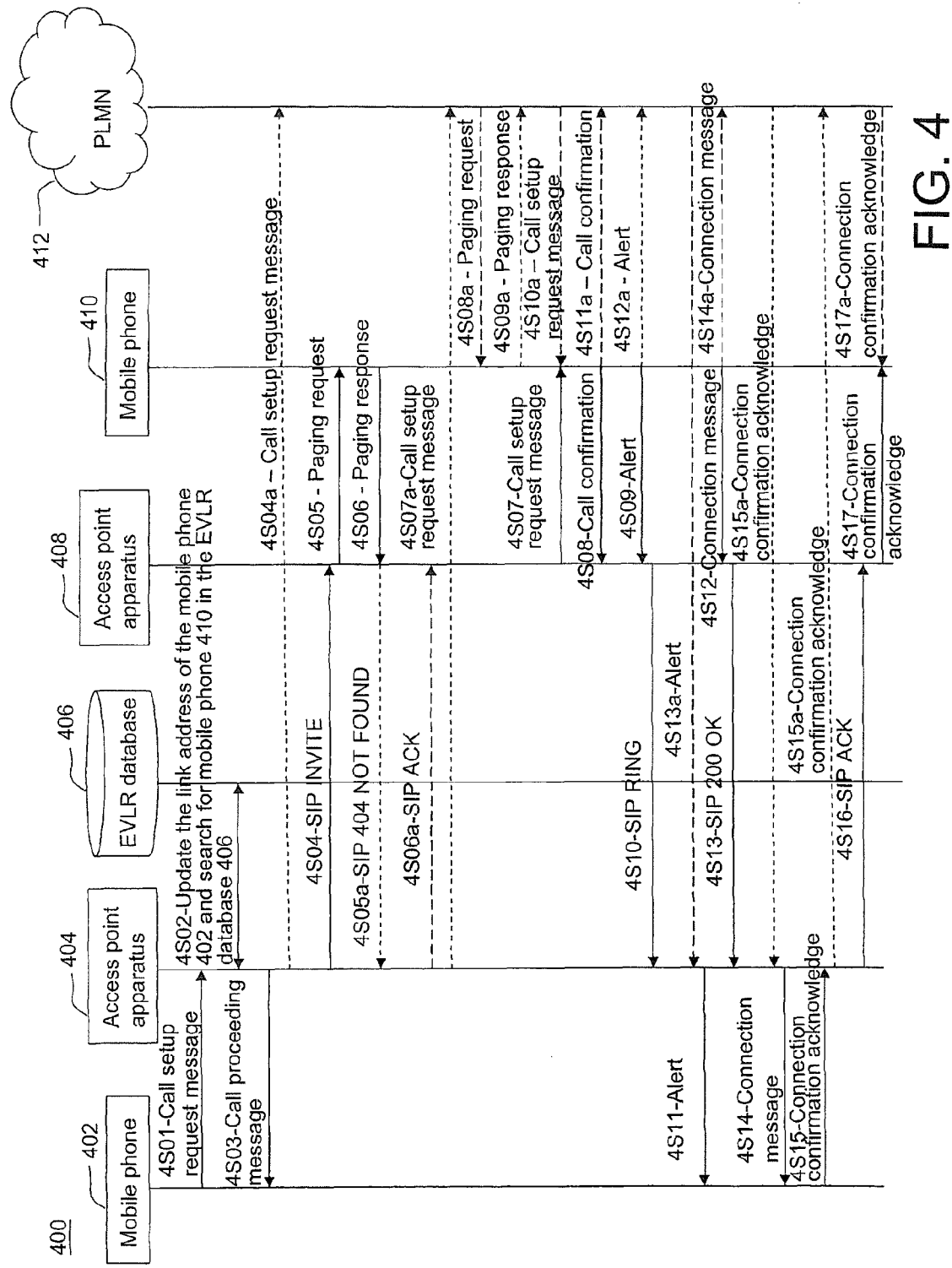
FIG. 4 is a flowchart of a call setup method in the network system 100 illustrated in FIG. 1 according to the first exemplary embodiment consistent with the present disclosure.

FIG. 4 is a flowchart of a call setup method in the MVPN system 100 illustrated in FIG. 1 according to the first exemplary embodiment consistent with the present disclosure. As shown in FIG. 4, the MVPN system 400 includes mobile phones 402 and 410, an access point apparatus 404 corresponding to the mobile phone 402 (i.e., the mobile phone 402 is within the wireless communication service coverage area of the access point apparatus 404), an access point apparatus 408 corresponding to the mobile phone 410 (i.e., the mobile phone 410 is within the wireless communication service coverage area of the access point apparatus 408), an EVLR database 406, and a PLMN 412. As shown in FIG. 4, the mobile phone 402 is a MO user while the mobile phone 410 is a MT user. Various steps of the call setup method provided by the present exemplary embodiment will be described herein. Besides, it should be mentioned that the access point apparatuses 404 and 408 may be the same access point apparatus or different access point apparatuses.

In step 4S01, the mobile phone 402 sends a connection management (CM) message (i.e., a call setup request message) to the access point apparatus 404 to set up a call with the mobile phone 410, wherein the call setup request message contains a user phone number or a private extension number of the MT user (the mobile phone 410).

In step 4S02, the access point apparatus 404 updates the link address field in the EVLR database 406 by using the user phone number or the private extension number of the mobile phone 402 as an identification index of the user identity module. Besides, the access point apparatus 404 further searches for the link address of the access point apparatus 408 corresponding to the mobile phone 410 in the EVLR database 406 by using the user phone number or the private extension number of the mobile phone 410 carried by the call setup request message in step 4S01.

In step 4S03, the access point apparatus 404 sends a CM message (i.e., a call proceeding message) to the mobile phone 402.

In step 4S04, the access point apparatus 404 determines whether the link address of the mobile phone 410 is valid. If the link address of the mobile phone 410 is valid, the access point apparatus 404 sends a session initiation protocol (SIP) message (i.e., an INVITE message) to the access point apparatus 408 corresponding to the mobile phone 410, wherein the SIP INVITE message contains the user phone numbers or the private extension numbers of the MO user and the MT user. If the link address of the mobile phone 410 is invalid, step 4S04a is executed.

In step 4S04a, the access point apparatus 404 relays the CM message (i.e., a setup message) to the PLMN 412.

In step 4S05, the access point apparatus 408 searches for the IMSI of the mobile phone 410 according to the user phone number or the private extension number of the mobile phone 410 and sends a radio resource control (RRC) message (i.e., a paging message) to the mobile phone 410. If the access point apparatus 408 does not receive any paging response from the mobile phone 410 before a paging timer times out, step 4S05a is executed.

In step 4S06, the access point apparatus 408 receives a paging response from the mobile phone 410 before the paging timer times out.

In step 4S07, the access point apparatus 408 sends a CM message (i.e., a call setup request message) to the mobile phone 410.

In step 4S08, after receiving the call setup request message, the mobile phone 410 sends a CM message (i.e., a call confirmation message) to the access point apparatus 408.

In step 4S09, after sending the call confirmation message to the access point apparatus 408, the mobile phone 410 sends a CM message (i.e., an alert message) to the access point apparatus 408.

In step 4S10, after receiving the alert message, the access point apparatus 408 transforms it into a SIP message (i.e., a RING message) and sends the SIP message to the access point apparatus 404.

In step 4S11, after receiving the SIP RING message, the access point apparatus 404 transforms it into a CM message (i.e., an alert message) and sends the CM message to the mobile phone 402.

In step 4S12, when the MT user receives an incoming call, the mobile phone 410 sends a CM message (i.e., a connection message) to the access point apparatus 408.

In step 4S13, after receiving the connection message, the access point apparatus 408 transforms it into a SIP message (i.e., a "200 OK" message) and sends the SIP message to the access point apparatus 404.

In step 4S14, after receiving the SIP 200 OK message, the access point apparatus 404 transforms it into a CM message (i.e., a connection message) and sends the CM message to the mobile phone 402.

In step 4S15, after receiving the connection message, the mobile phone 402 sends a CM message (i.e., a connection acknowledgement response message) to the access point apparatus 404.

In step 4S16, after receiving the connection confirmation acknowledgement message, the access point apparatus 404 transforms it into a SIP ACK message (i.e., an ACK message) and sends the SIP ACK message to the access point apparatus 408.

In step 4S17, after receiving the SIP ACK message, the access point apparatus 408 transforms it into a CM message (i.e., a connection confirmation acknowledgement message) and sends the CM message to the mobile phone 410. The call setup method provided by the present exemplary embodiment is ended once the mobile phone 410 receives the connection confirmation acknowledgement message.

In step 4S04a and steps 4S05a~4S07a, the execution of the call setup method provided by the present exemplary embodiment when the mobile phone 410 is not within the wireless communication service coverage area of any access point apparatus of the MVPN 110 (not shown) is described.

In step 4S05a, the access point apparatus 408 does not receive any paging response from the mobile phone 410 before the paging timer times out, so that the access point apparatus 408 sends a SIP response message (i.e., a 404 NOT FOUND message) to the access point apparatus 404.

In step 4S06a, the access point apparatus 404 sends a SIP message (i.e., a SIP ACK message) to the access point apparatus 408.

In step 4S07a, the access point apparatus 404 relays a CM message (i.e., a call setup request message) to the PLMN 412.

In steps 4S08a~4S17a of the call setup method, a call setup procedure with normal CM is executed through the PLMN 412, and because this procedure and related SIP messages are well known to those skilled in the art therefore will not be described herein.

Below, the operation procedure of an access point apparatus corresponding to a MO user in the call setup method provided by the present exemplary embodiment will be further described with reference to FIG. 5.

Figure 5:
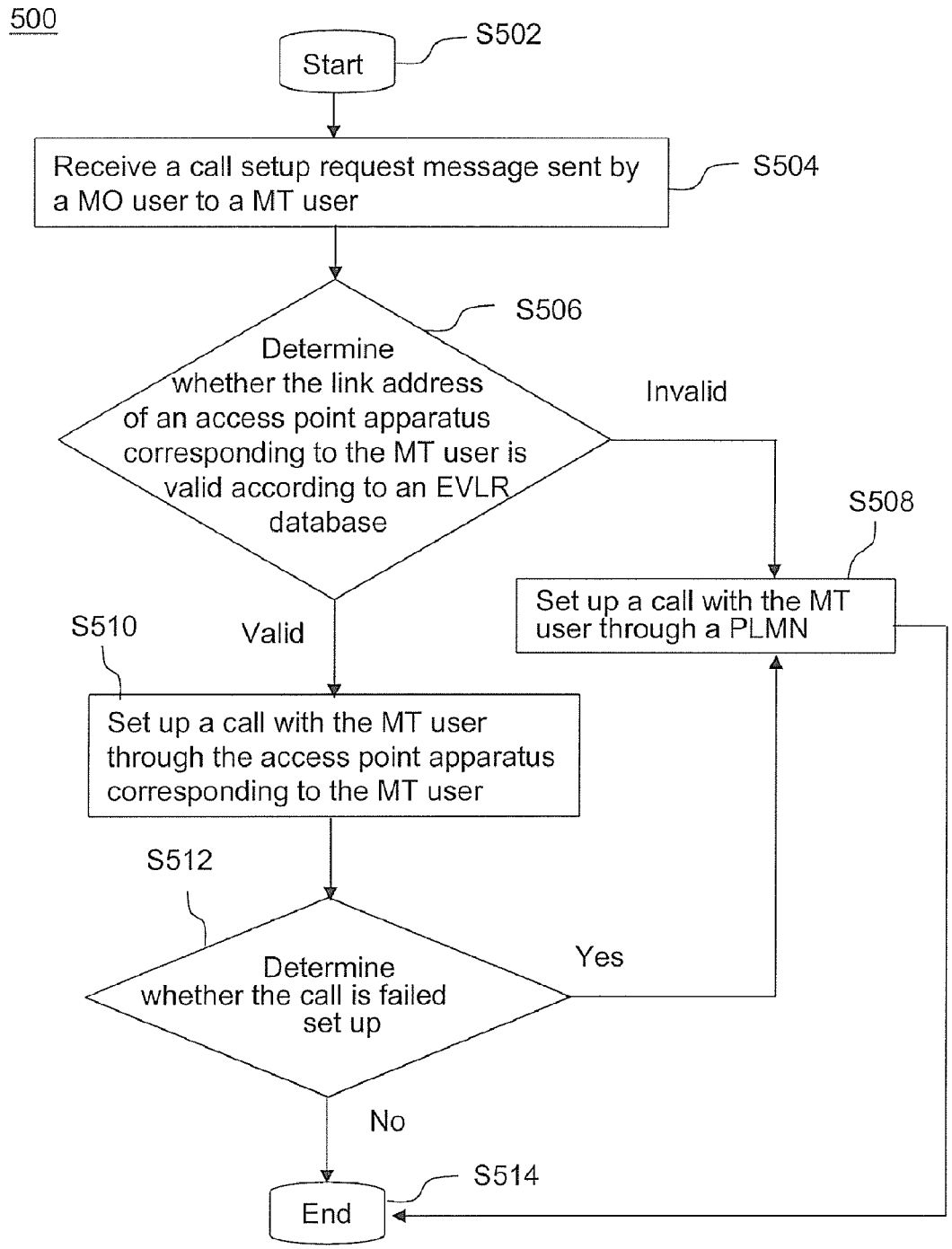
FIG. 5 is a flowchart illustrating the operation procedure of an access point apparatus corresponding to a mobile origination (MO) user in the call setup method illustrated in FIG. 4 according to the first exemplary embodiment consistent with the present disclosure.

FIG. 5 is a flowchart illustrating the operation procedure of an access point apparatus (not shown) corresponding to a MO user in the call setup method illustrated in FIG. 4 according to the first exemplary embodiment consistent with the present disclosure.

In step S502, the operation procedure of the access point apparatus 404 corresponding to the MO user starts.

In step S504, the access point apparatus 404 corresponding to the MO user receives a call setup request message sent by the MO user (the mobile phone 402) to the MT user (the mobile phone 410).

In step S506, the access point apparatus 404 determines whether the link address of the access point apparatus corresponding to the MT user is valid according to the EVLR database 406. If the link address of the access point apparatus corresponding to the MT user is valid, step S510 is executed. If the link address of the access point apparatus corresponding to the MT user is invalid, step S508 is executed.

In step S508, the mobile phone 402 and the mobile phone 410 set up the call through the PLMN 412. After that, step S514 is executed.

In step S510, the mobile phone 402 and the mobile phone 410 set up the call through the corresponding access point apparatus 404 and access point apparatus 408.

In step S512, the access point apparatus 404 determines whether the call is failed set up. If the call is not successfully set up, step S508 is executed, and if the call is successfully set up, step S514 is executed.

In step S514, the operation procedure of the access point apparatus 404 corresponding to the MO user ends.

Below, the operation procedure of an access point apparatus corresponding to a MT user in the call setup method provided by the present exemplary embodiment will be described with reference to FIG. 6.

Figure 6:
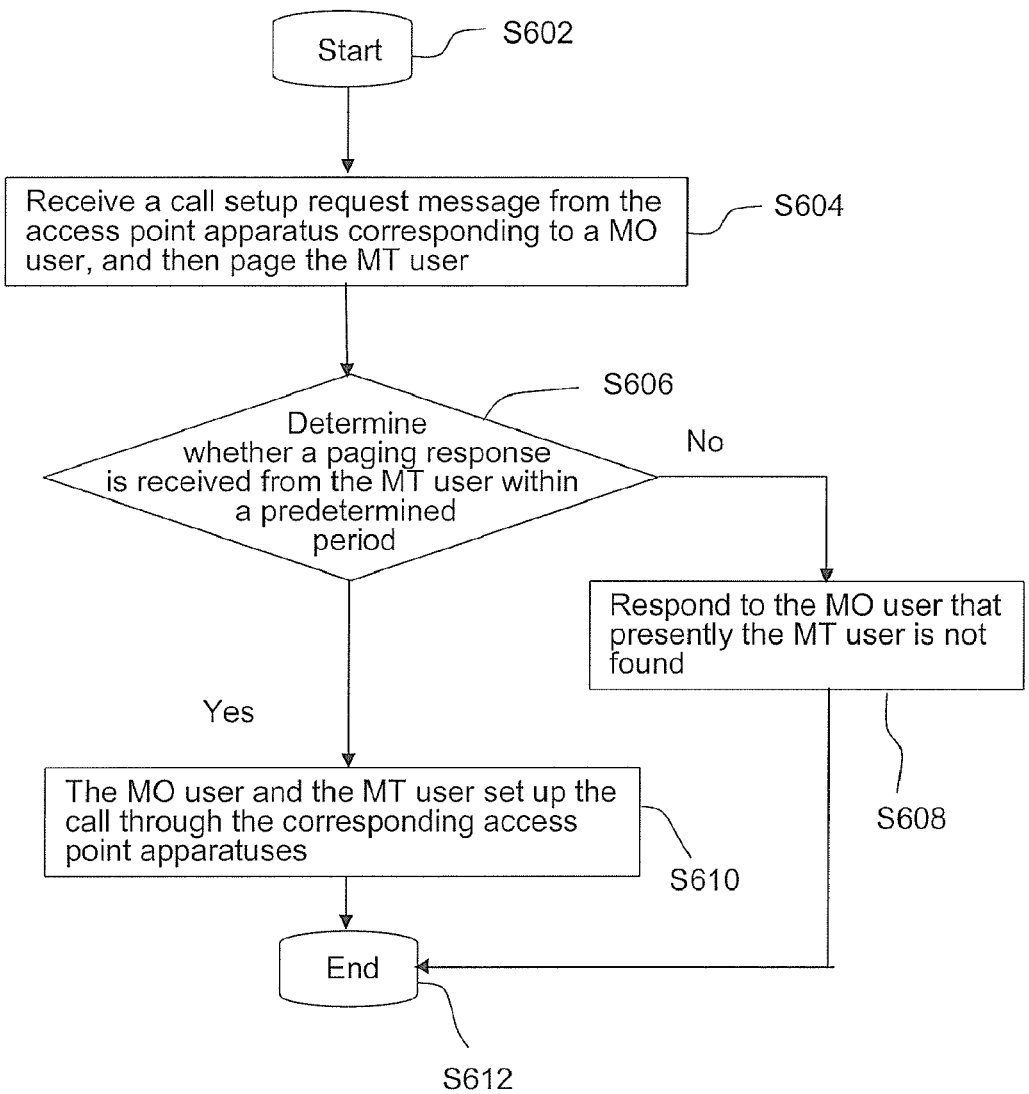
FIG. 6 is a flowchart illustrating the operation procedure of an access point apparatus corresponding to a mobile termination (MT) user in the call setup method illustrated in FIG. 4 according to the first exemplary embodiment consistent with the present disclosure.

FIG. 6 is a flowchart illustrating the operation procedure of an access point apparatus (not shown) corresponding to a MT user in the call setup method illustrated in FIG. 4 according to the first exemplary embodiment consistent with the present disclosure.

In step S602, the operation procedure of the access point apparatus 408 corresponding to the MT user starts.

In step S604, the access point apparatus 408 receives a call setup request message from the access point apparatus 404 corresponding to the MO user (the mobile phone 402) and pages the MT user.

In step S606, the access point apparatus 408 detects whether the MT user sends back a paging response within a predetermined period, wherein the predetermined period may be 5 seconds. If the MT user sends back a paging response within the predetermined period, step S610 is executed after step S606. Otherwise, step S608 is executed after step S606.

In step S608, the access point apparatus 408 responds to the access point apparatus 404 corresponding to the MO user that presently the MT user is not found. Step S612 is executed after step S608.

In step S610, the mobile phone 402 and the mobile phone 410 set up the call through the corresponding access point apparatus 404 and access point apparatus 408. In step S612, the operation procedure of the access point apparatus 408 corresponding to the MT user ends.

Second Exemplary Embodiment

Figure 7:
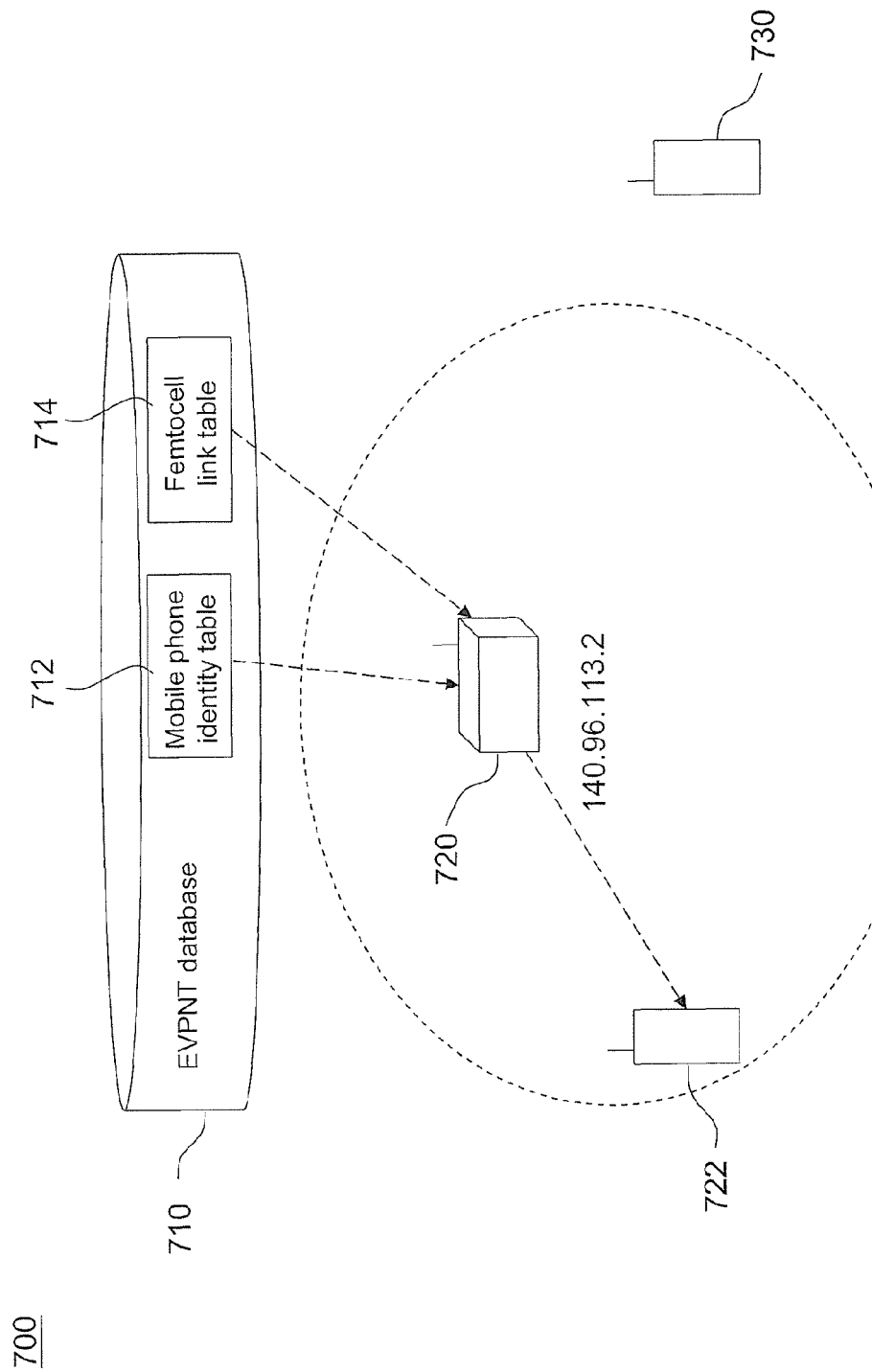
FIG. 7 is a diagram of a MVPN operating environment 700 according to a second exemplary embodiment consistent with the present disclosure.

FIG. 7 is a diagram of a MVPN operating environment 700 according to the second exemplary embodiment consistent with the present disclosure. Referring to both FIG. 1 and FIG. 7, in the present exemplary embodiment, the MVPN operating environment 700 is deployed in the enterprise building 120 or the enterprise building 130 illustrated in FIG. 1, and the MVPN operating environment 700 includes at least one enterprise virtual private network table (EVPNT) database 710, at least one access point apparatus 720, and mobile phones 722 and 732. The wireless connection between the access point apparatus 720 and the mobile phone 722 is similar to that between the access point apparatus 122 and the mobile phone 124 in the exemplary embodiment illustrated in FIG. 1. The embodiment described above is only an example but not intended to limit the present disclosure, and the MVPN operating environment 700 may also include more than 2 access point apparatuses and more than 2 mobile phones.

Referring to FIG. 1 and FIG. 7 again, the EVPNT database 710 includes a mobile phone identity table 712 and a femto-cell connection table 714. The mobile phone identity table 712 records the user phone numbers of all mobile phones in an enterprise, and the mobile phone identity table 712 records the IMSIs and private extension numbers of all the mobile phones. The femtocell connection table 714 records a femtocell identity (CID) and a link address of each access point apparatus. Unlike it in the first exemplary embodiment, in the present exemplary embodiment, the EVPNT database 710 does not record the link address of the access point apparatus corresponding to each user; instead, the CIDs of all the access point apparatuses of the MVPN 110 and the identity information of the mobile phones of the MVPN 110 are respectively recorded in different database structures, wherein the link address of an access point apparatus may be an IP address. For example, as shown in FIG. 7, the digits "140.96.113.2" beside the access point apparatus 720 is the IP address (i.e., the link address) of the access point apparatus 720.

Referring to FIG. 2 and FIG. 7 again, the present exemplary embodiment is similar to the first exemplary embodiment in that the IMSIs of the user identity modules, the user phone numbers, and the private extension numbers can be stored in the EVPNT database 710 in advance. Besides, in the present exemplary embodiment, the EVPNT database 710 may be an independent database server. In other exemplary embodiments, the EVPNT database 710 may be integrated with the MVPN database 112 illustrated in FIG. 1 or distributed to each access point apparatus (not shown) of the MVPN 110. If the EVPNT database 710 is distributed to each access point apparatus (not shown) of the MVPN 110, each access point apparatus (not shown) update the content in the database thereof through a message exchange manner so as to synchronize the data of the EVPNT database 710.

In the present exemplary embodiment, similar to the first exemplary embodiment, the dotted line around the access point apparatus 720 as shown in FIG. 7 indicates the wireless communication service coverage area of the access point apparatus 720. However, because the EVPNT database 710 does not record the link address of the access point apparatus corresponding to each user, when the mobile phone of an enterprise user is turned on and the user enters or leaves the wireless communication service coverage area of the access point apparatus 720, the access point apparatus 720 does not update the link address of the access point apparatus corresponding to the mobile phone, as what the access point apparatus 320 (not shown) in the first exemplary embodiment does.

Referring to FIG. 1 and FIG. 7, in the present exemplary embodiment, if neither of the private extension number and the user phone number of the MT user (the mobile phone 730) is recorded in the EVPNT database 710, the MO user (the mobile phone 722) and the MT user (the mobile phone 730) set up the call through the PLMN 150.

In the present exemplary embodiment, if the MT user is outside the wireless communication service coverage area of every access point apparatus (not shown) of the MVPN 110, the MO user (the mobile phone 722) and the MT user (the mobile phone 730) set up the call through the PLMN 150.

Figure 8:
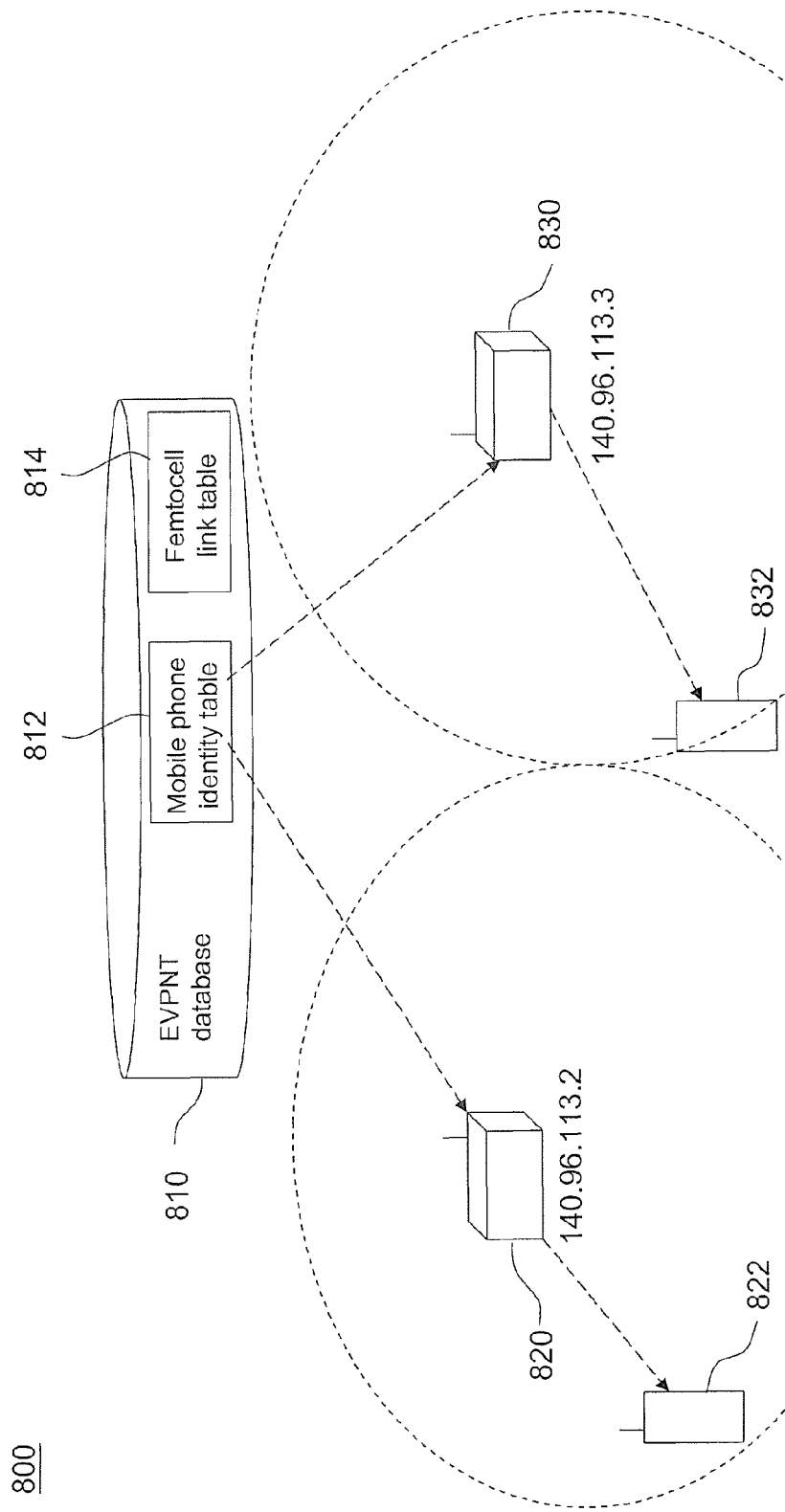
FIG. 8 is a diagram of a MVPN operating environment 800 according to the second exemplary embodiment consistent with the present disclosure.

FIG. 8 is a diagram of a MVPN operating environment 800 according to the second exemplary embodiment consistent with the present disclosure. Referring to FIG. 1 and FIG. 8, when a MO user (the mobile phone 822) makes a phone call to a MT user (the mobile phone 832) within the wireless communication service coverage area of the corresponding access point apparatus 820, the access point apparatus 820 request all the access point apparatuses of the MVPN 110 to page the mobile phone 832 within the wireless communication service coverage areas thereof. If the mobile phone 832 is within the wireless communication service coverage area of any access point apparatus (for example, the access point apparatus 830), the subsequent call setup procedure is handed over to the access point apparatuses 820 and 830. If the mobile phone 832 is not within the wireless communication service coverage area of any access point apparatus, the subsequent call setup procedure is handed over to the MSC 156 of the PLMN 150 and the access point apparatus 820. It should be mentioned that the access point apparatus 820 also pages the mobile phone 832 within the wireless communication service coverage area thereof so that if the mobile phone 832 is within the wireless communication service coverage area of the access point apparatus 820, the subsequent call setup procedure is carried out by only the access point apparatus 820.

Figure 9:
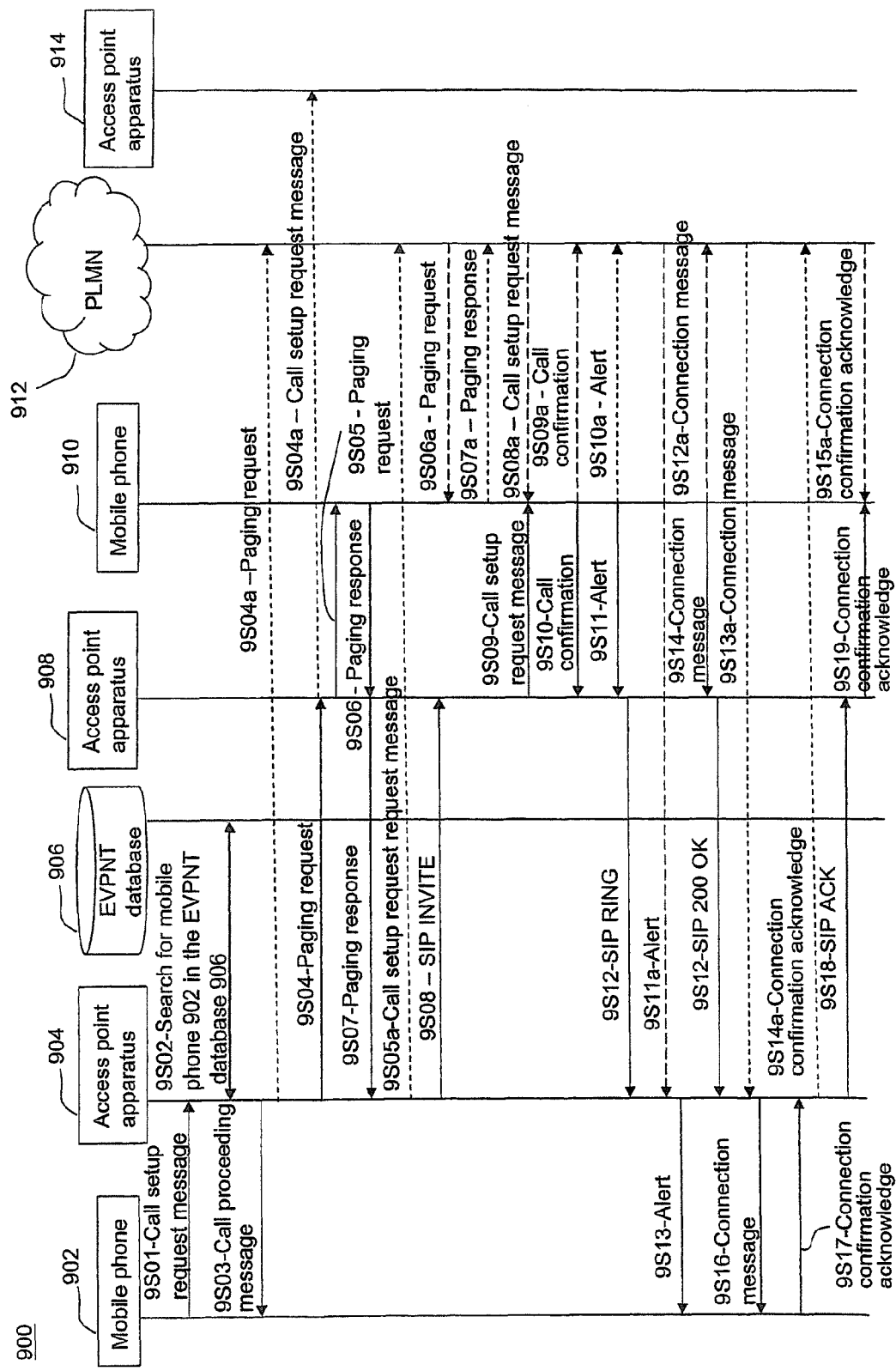
FIG. 9 is a flowchart of a call setup method in the network system 100 illustrated in FIG. 1 according to the second exemplary embodiment consistent with the present disclosure.

FIG. 9 is a flowchart of a call setup method in the MVPN system 100 illustrated in FIG. 1 according to the second exemplary embodiment consistent with the present disclosure. Referring to FIG. 9, the MVPN system 900 includes mobile phones 902 and 910, an access point apparatus 904 corresponding to the mobile phone 902 (i.e., the mobile phone 902 is within the wireless communication service coverage area of the access point apparatus 904), an access point apparatus 908 corresponding to the mobile phone 910 (i.e., the mobile phone 910 is within the wireless communication service coverage area of the access point apparatus 908), an EVPNT database 906, a PLMN 912, and an access point apparatus 914. As shown in FIG. 9, the mobile phone 902 is a MO user while the mobile phone 910 is a MT user. Below, various steps of the call setup method provided by the present exemplary embodiment will be described. In addition, it should be mentioned that the access point apparatuses 904 and 908 may be the same access point apparatus or different access point apparatuses.

In step 9S01, the mobile phone 902 sends a CM message (i.e., a call setup request message) to the access point apparatus 904 to set up a call with the mobile phone 910, wherein the call setup request message contains the user phone number or the private extension number of the mobile phone 910.

In step 9S02, the access point apparatus 904 determines whether the mobile phone 910 is a mobile phone in the MVPN 110 according to the EVPNT database 906 by using the user phone number or the private extension number of the mobile phone 910 as an identification index of the user identity module.

In step 9S03, the access point apparatus 904 sends a CM message (i.e., a call proceeding message) to the mobile phone 902.

In step 9S04, the access point apparatus 904 searches for the mobile phone 410 according to the user phone number or the private extension number of the mobile phone 910 and sends a radio access network application part (RANAP) message (i.e., a paging request) to all the access point apparatuses (including the access point apparatuses 908 and 904) of the MVPN 110. If the access point apparatus 904 does not receive a paging response from the mobile phone 910 before the paging timer times out, step 9S05a is executed.

In step 9S04a, the access point apparatus 904 relays the CM message (i.e., a setup message) to the PLMN 912.

In step 9S05, after receiving the RANAP message (i.e., the paging request), the access point apparatus 908 sends a RRC message (i.e., a paging message) to the mobile phone 910. If the access point apparatus 908 does not receive the paging response from the mobile phone 910 before the paging timer times out, step 9S05a is executed.

In step 9S06, the access point apparatus 908 receives a RRC paging response message from the mobile phone 910 before the paging timer times out and sends a RANAP message (i.e., the paging response) to the access point apparatus 904.

In step 9S07, the access point apparatus 904 receives a paging response message from the access point apparatus 908 before the paging timer times out.

In step 9S08, after receiving the paging response message, the access point apparatus 904 searches for the link address (for example, an IP address) of the access point apparatus 908 according to an identity message (the identity message is the content of an message) of the access point apparatus and sends a SIP message (i.e., an INVITE message) to the access point apparatus 908.

In step 9S09, after receiving the SIP message (i.e., the INVITE message), the access point apparatus 908 sends a CM message (i.e., a call setup request message) to the mobile phone 910.

In step 9S10, after receiving the CM message (i.e., the call setup request message), the mobile phone 910 sends a CM message (i.e., a call confirmation message) to the access point apparatus 908.

In step 9S11, after sending the CM message (i.e., the call confirmation message) to the access point apparatus 908, the mobile phone 910 sends a CM message (i.e., an alert message) to the access point apparatus 908.

In step 9S12, after receiving the CM message (i.e., the alert message), the mobile phone 910 transforms it into a SIP message (i.e., a RING) and sends the SIP message to the access point apparatus 904.

In step 9S13, after receiving the SIP message (i.e., the RING message), the access point apparatus 904 transforms it into a CM message (i.e., a alert message) and sends the CM message to the mobile phone 902.

In step 9S14, when the mobile phone 910 receives an incoming call, the mobile phone 910 sends a CM message (i.e., a connection message) to the access point apparatus 908.

In step 9S15, after receiving the connection message, the access point apparatus 908 transforms it into a SIP message (i.e., a 200 OK message) and sends the SIP message to the access point apparatus 904.

In step 9S16, after receiving the SIP message (i.e., the 200 OK message), the access point apparatus 904 transforms it into a CM message (i.e., a connection message) and sends the CM message to the mobile phone 902.

In step 9S17, after receiving the connection message, the mobile phone 902 sends a CM message (i.e., a connection confirmation acknowledgement message) to the access point apparatus 904.

In step 9S18, after receiving the connection confirmation acknowledgement message, the access point apparatus 904 transforms it into a SIP ACK message (i.e., an ACK message) and sends the SIP ACK message to the access point apparatus 908.

In step 9S19, after receiving the SIP ACK message (i.e., the ACK message), the access point apparatus 908 transforms it into a CM message (i.e., a connection confirmation acknowledgement message) and sends the CM message to the mobile phone 910. The call setup method provided by the present exemplary embodiment ends when the mobile phone 910 receives the connection confirmation acknowledgement message.

In step 9S04a and steps 9S05a~9S17a, the execution of the call setup method provided by the present exemplary embodiment when the mobile phone 910 is not within the wireless communication service coverage area of any access point apparatus of the MVPN 110 is described.

In step 9S05a, the access point apparatus 904 relays a CM message (i.e., a call setup request message) to the PLMN 912.

In steps 9S06a~9S15a of the call setup method, a call setup procedure with normal CM is executed through the PLMN 912, and because this procedure and related SIP messages are well known to those skilled in the art therefore will not be described herein.

It should be noted that in steps 9S04a and 9S04, besides sending a paging request to the access point apparatus 908, the access point apparatus further sends the same paging request to other access point apparatuses (for example, the access point apparatus 914) of the MVPN 110. However, in the present exemplary embodiment, only the mobile phone 910 receives the paging response of the access point apparatus 908 so that the access point apparatus 914 which does not receive the paging response does not perform any response action. Below, the operation procedure of an access point apparatus corresponding to a MO user in the call setup method provided by the present exemplary embodiment will be further described with reference to FIG. 10.

Figure 10:
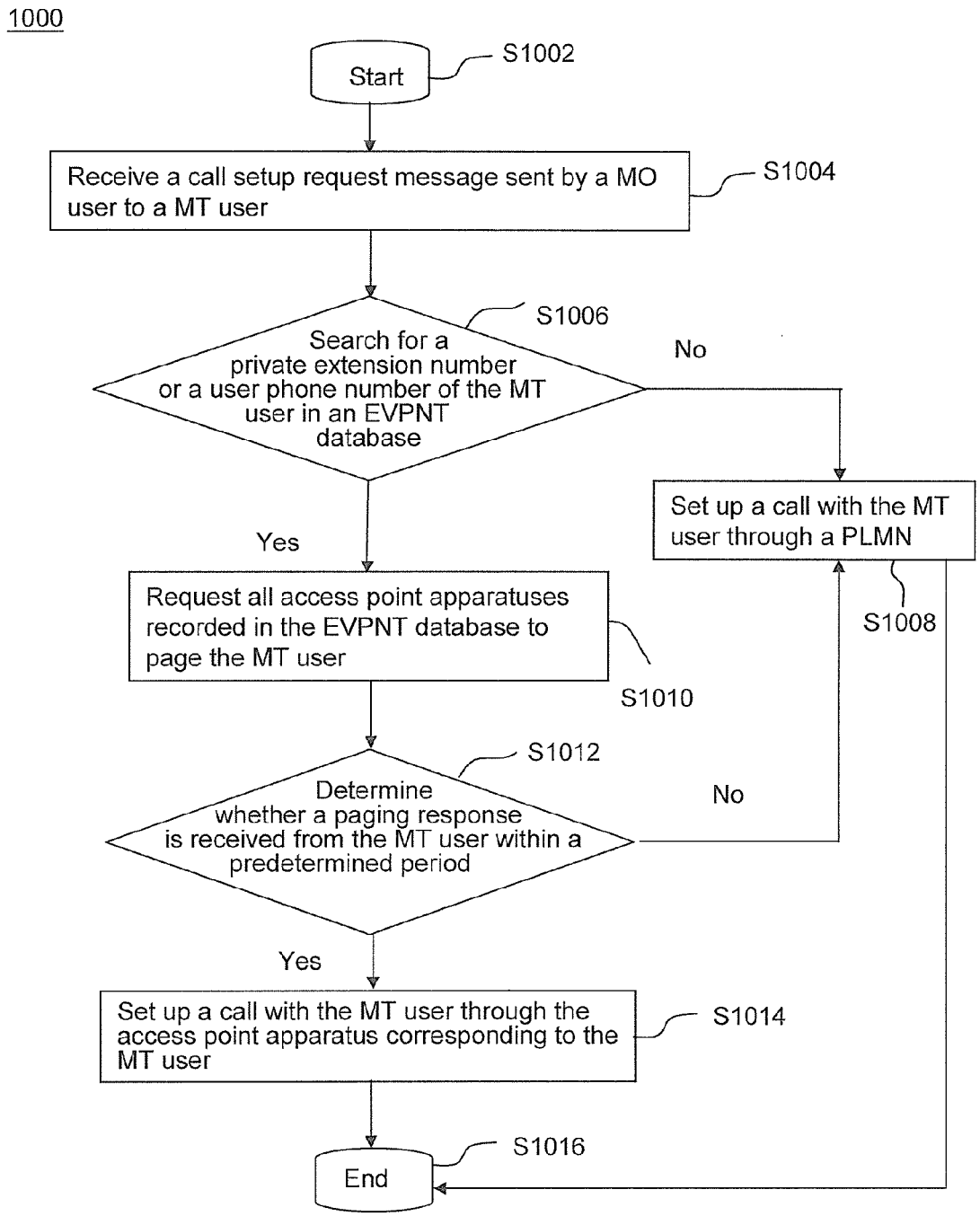
FIG. 10 is a flowchart illustrating the operation procedure of an access point apparatus corresponding to a MO user in the call setup method illustrated in FIG. 9 according to the second exemplary embodiment consistent with the present disclosure.

FIG. 10 is a flowchart illustrating the operation procedure of an access point apparatus corresponding to a MO user in the call setup method illustrated in FIG. 9 according to the second exemplary embodiment consistent with the present disclosure.

In step S1002, the operation procedure of the access point apparatus 904 corresponding to the MO user starts.

In step S1004, the access point apparatus 904 corresponding to the MO user receives a call setup request message sent by the MO user (the mobile phone 902) to the MT user (the mobile phone 910).

In step S1006, the access point apparatus 904 searches for the private extension number or the user phone number of the mobile phone 910 in the EVPNT database 906. This step is to determine whether the mobile phone 910 is a mobile phone of the MVPN 110 (not shown).

In step S1008, the mobile phone 902 and the mobile phone 910 set up the call through the PLMN 912. Step S1016 is executed after step S1008.

In step S1010, the access point apparatus 904 requests all the access point apparatuses recorded in the EVPNT database 906 to search for the mobile phone 910. In this step, each access point apparatus pages the mobile phone 910. It is determined that the mobile phone 910 is not found or the mobile phone 910 is not within the wireless communication service coverage area of any access point apparatus of the MVPN 110 (not shown) if no paging response is received from the MT user before the paging timer times out.

In step S1012, the access point apparatus 904 detects whether the paging response is received from the mobile phone 910 within a predetermined period, wherein the predetermined period may be 5 seconds. If the paging response is received from the mobile phone 910 within the predetermined period, step S1014 is executed after step S1012. If the paging response is not received from the mobile phone 910 within the predetermined period, step S1008 is executed after step S1012.

In step S1014, the mobile phone 902 and the mobile phone 910 set up the call through the corresponding access point apparatus 904 and access point apparatus 908.

In step S1016, the operation procedure of the access point apparatus 904 corresponding to the MO user ends.

Below, the operation procedure of an access point apparatus corresponding to the MT user in the call setup method provided by the present exemplary embodiment will be further described with reference to FIG. 11.

Figure 11:
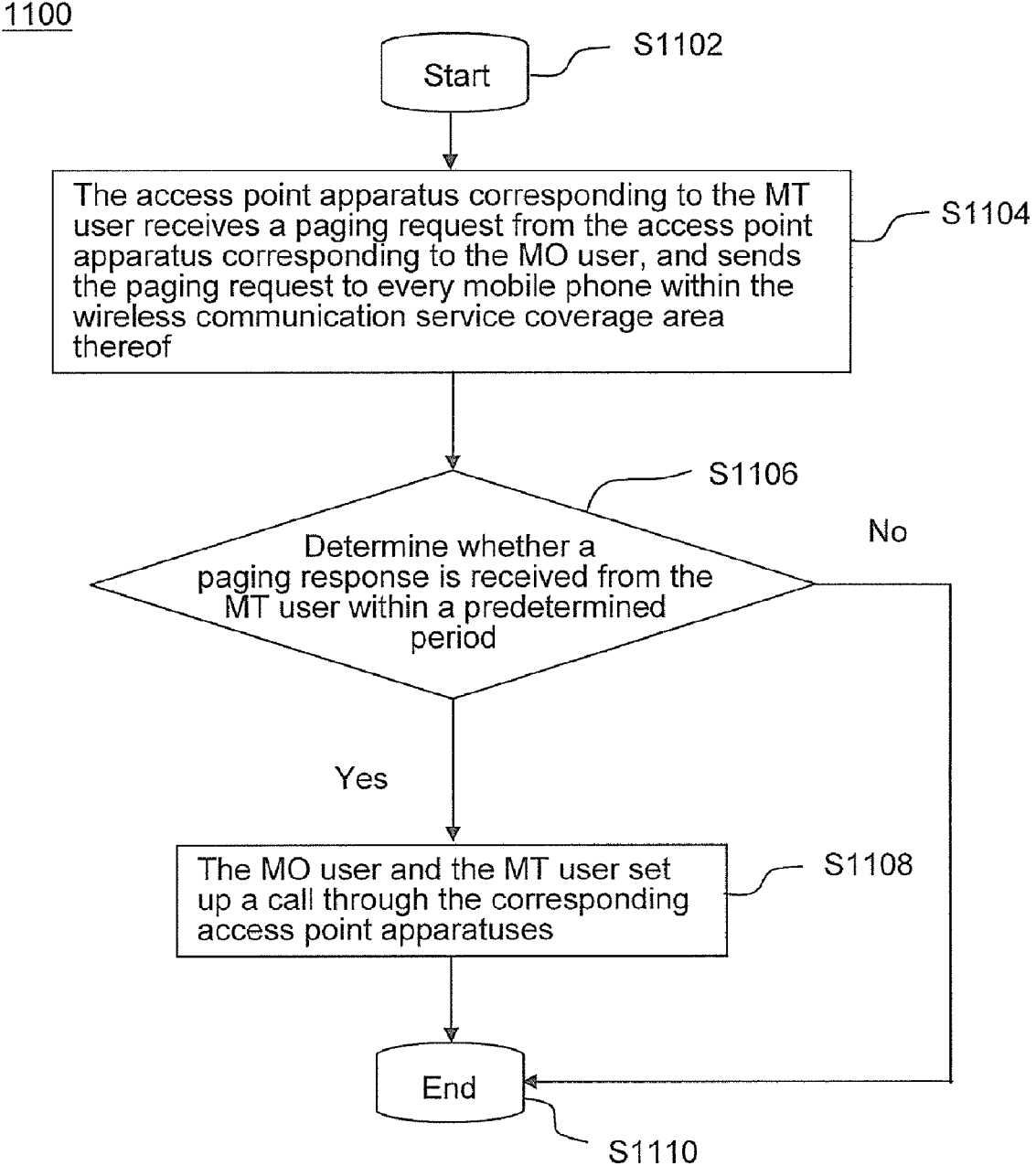
FIG. 11 is a flowchart illustrating the operation procedure of an access point apparatus corresponding to a MT user in the call setup method illustrated in FIG. 9 according to the second exemplary embodiment consistent with the present disclosure.

FIG. 11 is a flowchart illustrating the operation procedure of an access point apparatus corresponding to a MT user in the call setup method illustrated in FIG. 9 according to the second exemplary embodiment consistent with the present disclosure.

In step S1102, the operation procedure of the access point apparatus 908 corresponding to the MT user starts.

In step S1104, the access point apparatus 908 receives a paging request from the access point apparatus 904 corresponding to the mobile phone 902 and sends the paging request to every mobile phone within the wireless communication service coverage area thereof.

In step S1106, the access point apparatus 908 detects whether a paging response is received from the mobile phone 910 within a predetermined period, wherein the predetermined period may be 5 seconds. If the paging response is received from the mobile phone 910 within the predetermined period, step S1110 is executed after step S1106. Contrarily, if the paging response is not received from the mobile phone 910 within the predetermined period, step S1110 is executed after step S1106.

In step S1108, the mobile phone 902 and the mobile phone 910 set up the call through the corresponding access point apparatus 904 and access point apparatus 908. After that, step S1110 is executed.

In step S1110, the operation procedure of the access point apparatus 908 corresponding to the MT user ends. It should be noted that even though foregoing procedure is described regarding the access point apparatus 908, it is applicable to the access point apparatus 914 as well. As to the access point apparatus 914, since the mobile phone 910 is not within the wireless communication service coverage area of the access point apparatus 914, the access point apparatus 914 does not receive the paging response within the predetermined period. Contrarily, as to the access point apparatus 908, since the mobile phone 910 is within the wireless communication service coverage area of the access point apparatus 908, the access point apparatus 908 receives the paging responses within the predetermined period.

Third Exemplary Embodiment

Figure 12:
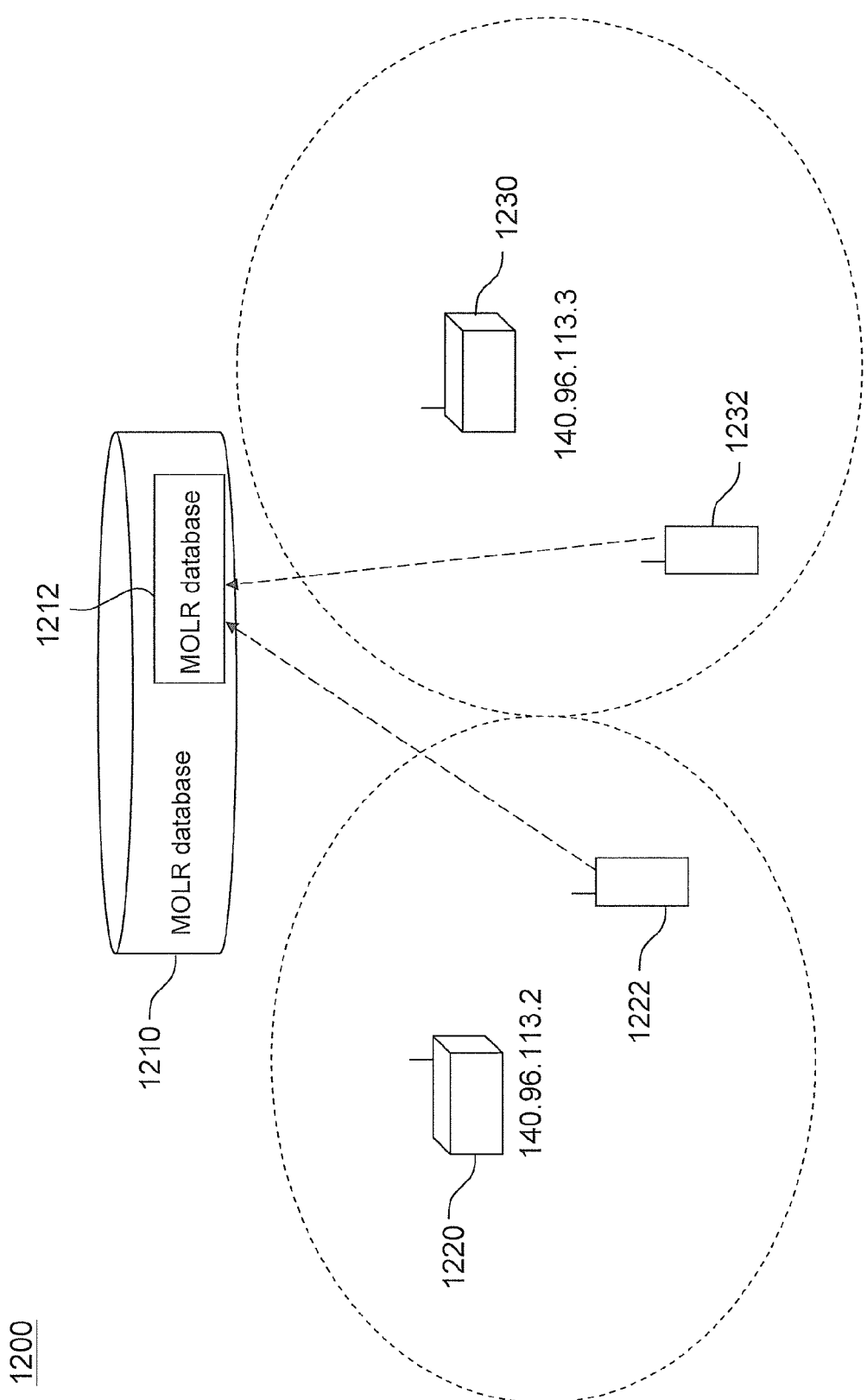
FIG. 12 is a diagram of a MVPN operating environment 1200 according to a third exemplary embodiment consistent with the present disclosure.

FIG. 12 is a diagram of a MVPN operating environment 1200 according to the third exemplary embodiment consistent with the present disclosure. Referring to both FIG. 1 and FIG. 12, in the present exemplary embodiment, the MVPN operating environment 1200 is deployed in the enterprise building 120 or the enterprise building 130 illustrated in FIG. 1, and the MVPN operating environment 1200 includes at least one mobile origination location registrar (MOLR) database 1210, access point apparatuses 1220 and 1230, and mobile phones 1222 and 1232. The wireless connection between the access point apparatus 1220 and the mobile phone 1222 is similar to that between the access point apparatus 122 and the mobile phone 124 in the exemplary embodiment illustrated in FIG. 1. The wireless connection between the access point apparatus 1220 and the mobile phone 1222 is similar to that between the access point apparatus 122 and the mobile phone 124 in the exemplary embodiment illustrated in FIG. 1. The embodiment described above is only an example but not intended to limit the present disclosure, and the MVPN operating environment 1200 may also include more than 2 access point apparatuses and more than 2 mobile phones.

Referring to FIG. 1 and FIG. 12 again, the MOLR database 1210 records the user identity modules (not shown) of all mobile phones in an enterprise, wherein each user identity module includes an IMSI, a user phone number, a private extension number, and a link address of the corresponding access point apparatus. Unlike the first exemplary embodiment, in the present exemplary embodiment, the MOLR database 1210 does not record the link address of the corresponding access point apparatus when a mobile phone user is not in a mobile origination state; instead, the link address field is set as invalid, wherein the link address of the access point apparatus may be an IP address. For example, as shown in FIG. 12, the digits "140.96.113.2" beside the access point apparatus 1220 indicates the IP address (i.e., the link address) of the access point apparatus 1220. Besides, the MOLR database 1210 is also served as a gateway and has a state table (not shown) for recording calls set up and processed between the MO users and MT users of the MVPN 110.

Referring to FIG. 2 and FIG. 12 again, the present exemplary embodiment is similar to the first exemplary embodiment in that the IMSI, the user phone number, and the private extension number of each user identity module can be stored in the MOLR database 1210 in advance. Additionally, in the present exemplary embodiment, the MOLR database 1210 is an independent database server. In other exemplary embodiments, the MOLR database 1210 may be integrated with the MVPN database 112 illustrated in FIG. 1 or distributed to each access point apparatus (not shown) of the MVPN 110. If the MOLR database 1210 is distributed to each access point apparatus of the MVPN 110, each access point apparatus updates the content of the database thereof through a message exchange manner so as to synchronize the data of the MOLR database 1210.

In the present exemplary embodiment, similar to the first exemplary embodiment, the dotted lines around the access point apparatuses 1220 and 1230 in FIG. 12 indicate the wireless communication service coverage areas of the access point apparatuses 1220 and 1230. However, different from the first exemplary embodiment, the access point apparatus corresponding to a MO user only updates the link address of the access point apparatus corresponding to the user identity module of the mobile phone of the MO user in the MOLR database 1210 when the MO user uses his mobile phone to make a phone call to another mobile phone. For example, when the MO user (the mobile phone 1222) is within the wireless communication service coverage area of the access point apparatus 1220 and makes a phone call to the MT user (the mobile phone 1232), the access point apparatus 1220 updates the link address of the access point apparatus corresponding to the mobile phone 1222 in the MOLR database 1210 to "140.96.113.2". If the MO user does not make any phone call or the call has ended, the access point apparatus sets the link address of the access point apparatus corresponding to the user identity module of the mobile phone thereof in the MOLR database 1210 as invalid.

Referring to FIG. 1 and FIG. 12 again, once the call setup procedure starts, the access point apparatus 1220 first relays the call setup request message from the MO user (the mobile phone 1222) to the MSC 156 of the PLMN 150. In the present exemplary embodiment, a database (not shown) of the PLMN 150 stores the current access point location area (LA) of the mobile phone.

Referring to FIG. 1 and FIG. 12 again, the MSC 156 first instructs the MVPN 110 to page all the mobile phones within the present LA of the mobile phone 1232, wherein these mobile phones belong to the MVPN 110.

Referring to FIG. 1 and FIG. 12 again, if an access point apparatus (for example, the access point apparatus 1230) of the MVPN 110 receives a paging response from the mobile phone 1232, the access point apparatus sends the paging response back to the MSC 156. Then, the MSC 156 sends a call setup request message to the access point apparatus 1230 corresponding to the mobile phone 1232. The subsequent call setup procedure is handed over to the access point apparatus 1220 corresponding to the mobile phone 1222 and the access point apparatus 1230 corresponding to the mobile phone 1232. Below, various steps of the call setup method provided by the present exemplary embodiment will be described.

Figure 13:
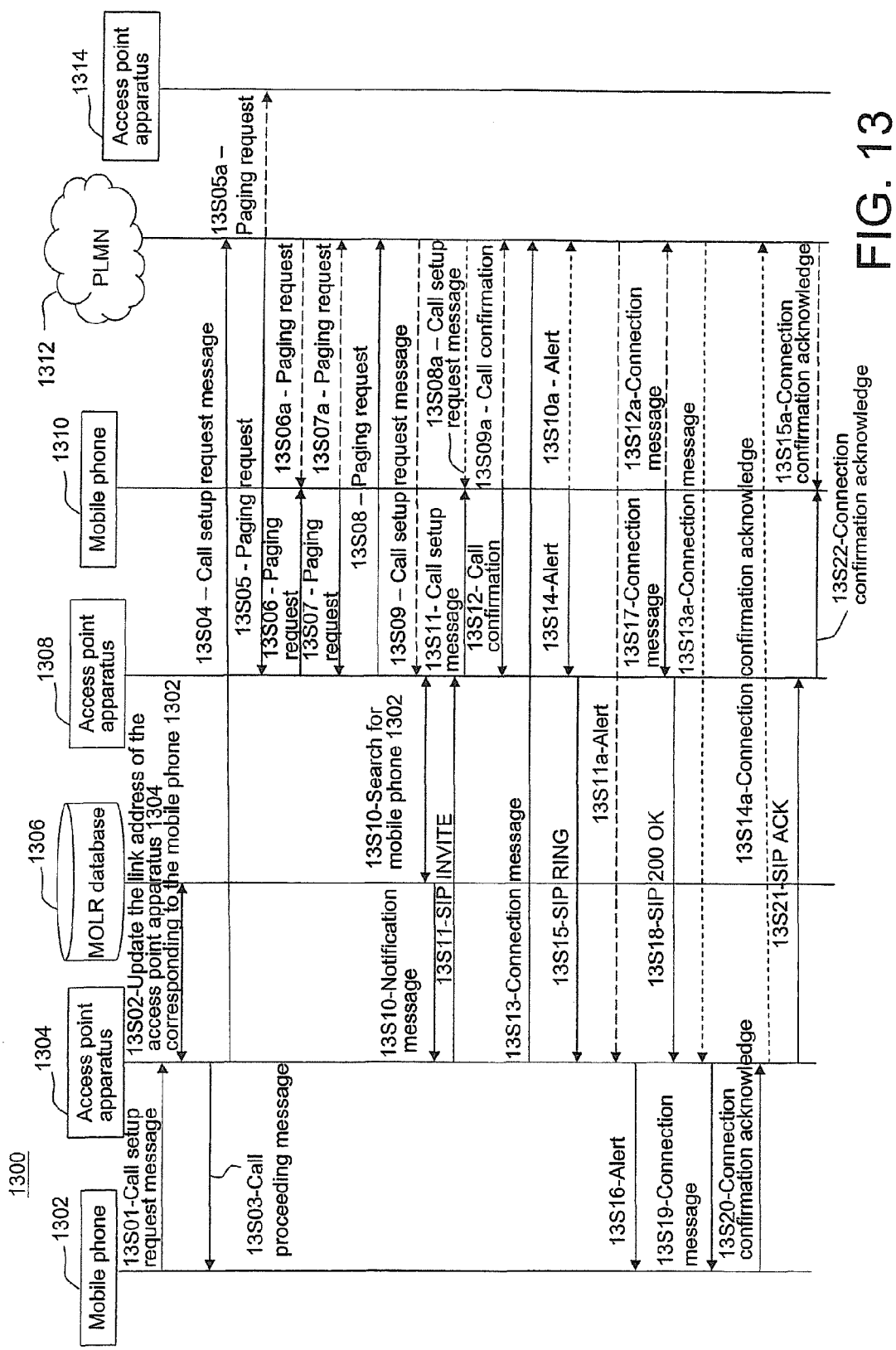
FIG. 13 is a flowchart of a call setup method in the network system 100 illustrated in FIG. 1 according to the third exemplary embodiment consistent with the present disclosure.

FIG. 13 is a flowchart of a call setup method in the MVPN system 100 illustrated in FIG. 1 according to the third exemplary embodiment consistent with the present disclosure. As shown in FIG. 13, the network system 1300 includes mobile phones 1302 and 1310, an access point apparatus 1304 corresponding to the mobile phone 1302 (i.e., the mobile phone 1302 is within the wireless communication service coverage area of the access point apparatus 1304), an access point apparatus 1308 corresponding to the mobile phone 1310 (i.e., the mobile phone 1310 is within the wireless communication service coverage area of the access point apparatus 1308), an MOLR database 1306, and a PLMN 1312. As shown in FIG. 13, the mobile phone 1302 is a MO user while the mobile phone 1310 is a MT user. Below, various steps of the call setup method provided by the present exemplary embodiment will be described. Besides, it should be mentioned that the access point apparatuses 1304 and 1308 may be the same access point apparatus or different access point apparatuses.

In step 13S01, the mobile phone 1302 sends a CM message (i.e., a call setup request message) to the access point apparatus 1304 to set up a call with the mobile phone 1310, wherein the call setup request message contains a user phone number or a private extension number of the mobile phone 1310.

In step 13S02, the access point apparatus 1304 updates the link address of the access point apparatus corresponding to the mobile phone 1302 in the MOLR database 1210 by using the user phone number or the private extension number of the mobile phone 1310 as an identification index of the user identity module. Meanwhile, the access point apparatus 1304 obtains the user phone number of the MO user from the MOLR database 1210. In addition, the MOLR database 1210 records the state that the mobile phone 1302 is about to set up a call with the mobile phone 1310 in a state table (not shown).

In step 13S03, the access point apparatus 1304 sends a CM message (i.e., a call proceeding message) to the mobile phone 1302.

In step 13S04, the access point apparatus 1304 relays a CM message (i.e., a call setup request message) to the PLMN 1312.

In step 13S05, the PLMN 1312 determines whether the mobile phone 1302 is within the wireless communication service coverage area of any access point apparatus of the MVPN 110 (not shown) through the MSC 156. If the mobile phone 1302 is not within the wireless communication service coverage area of any access point apparatus of the MVPN 110 (not shown), step 1306a is executed. If the mobile phone 1302 is within the wireless communication service coverage area of an access point apparatus of the MVPN 110 (not shown), the MSC 156 sends a RANAP message (i.e., a paging request message) to the access point apparatus 1308.

In step 13S06, after receiving the RANAP message (i.e., the paging request) from the MSC 156 of the PLMN 1312, the access point apparatus 1308 sends a RRC message (i.e., a paging message) to the mobile phone 1310.

In step 13S07, the access point apparatus 1308 receives a RRC paging response message from the mobile phone 1310 before the paging timer times out.

In step 13S08, the access point apparatus 1308 sends a RANAP message (i.e., a paging response) to the MSC 156 of the PLMN 1312.

In step 13S09, the MSC 156 of the PLMN 1312 sends a CM message (i.e., a call setup request message) to the access point apparatus 1308.

In step 13S10, after receiving the CM message (i.e., the call setup request message), the access point apparatus 1308 searches for the link address of the access point apparatus corresponding to the mobile phone 1302 in the MOLR database 1210. If this link address is invalid, the call setup job is completed through a normal call setup procedure of the PLMN 1312. If this link address is valid, the MOLR database 1210 sends a notification message (containing the user phone number of the MO user, the user phone number of the MT user, and the link addresses of the corresponding access point apparatuses) to the access point apparatus 1304. Next, after receiving the notification message, the access point apparatus 1304 determines whether the recorded user phone numbers of the MO user and the MT user are the same as the user phone numbers of the MO user and the MT user carried by the notification message of the MOLR database 1210. If the user phone numbers of the MO user and the MT user recorded in the access point apparatus 1304 are the same as those carried by the notification message of the MOLR database 1210, in step 13S11, the access point apparatus 1304 sends a SIP message (i.e., an INVITE message) to the access point apparatus 1308. Meanwhile, the access point apparatus 1308 waits for the SIP INVITE message (containing the user phone number of the MO user, the user phone number of the MT user, and the link address of the access point apparatus corresponding to the MO user) of the access point apparatus 1304.

In step 13S11, the access point apparatus 1304 sends a SIP message (i.e., an INVITE message) to the access point apparatus 1308. After receiving the SIP message (i.e., the INVITE message), the access point apparatus 1308 relays a CM message (i.e., a call setup request message) to the mobile phone 1310.

In step 13S12, after receiving the CM message (i.e., the call setup request message), the mobile phone 1310 sends a CM message (i.e., a call confirmation message) to the access point apparatus 1308.

In step 13S13, after receiving a SIP message (i.e., a INVITE message), the access point apparatus 1304 sends a CM message (i.e., a cancellation message) to the PLMN 1312 to cancel the call previously set up through the PLMN 1312.

In step 13S14, after sending a CM message (i.e., a call confirmation message) to the access point apparatus 1308, the mobile phone 1310 sends a CM message (i.e., a alert message) to the access point apparatus 1308.

In step 13S15, after receiving the alert message, the access point apparatus 1308 transforms it into a SIP message (i.e., a RING message) and sends the SIP message to the access point apparatus 1304.

In step 13S16, after receiving the SIP message (i.e., the RING message), the access point apparatus 1304 transforms it into a CM message (i.e., a alert message) and sends the CM message to the mobile phone 1302.

In step 13S17, when the mobile phone 1310 receives the incoming call, the mobile phone 1310 sends a CM message (i.e., a connection message) to the access point apparatus 1308.

In step 13S18, after receiving the CM message (i.e., the connection message), the access point apparatus 1308 transforms it into a SIP message (i.e., a 200 OK message) and sends the SIP message to the access point apparatus 1304.

In step 13S19, after receiving the SIP message (i.e., the 200 OK message), the access point apparatus 1304 transforms it into a CM message (i.e., a connection confirmation message) and sends the CM message to the mobile phone 1302.

In step 13S20, after receiving the connection confirmation message, the mobile phone 1302 sends a CM message (i.e., a connection confirmation acknowledgement message) to the access point apparatus 1304.

In step 13S21, after receiving the connection confirmation acknowledgement message, the access point apparatus 1304 transforms it into a SIP ACK message (i.e., an ACK message) and sends the SIP ACK message to the access point apparatus 1308.

In step 13S22, after receiving the SIP ACK message (i.e., the ACK message), the access point apparatus 1308 transforms it into a CM message (i.e., a connection confirmation acknowledgement message) and sends the CM message to the mobile phone 1310. The call setup method provided by the present exemplary embodiment ends when the mobile phone 1310 receives the connection confirmation acknowledgement message.

In steps 13S06a~13S15a of the call setup method, a call setup procedure with normal CM is executed through the PLMN 1312, and because this procedure and related SIP messages are well known to those skilled in the art therefore will not be described herein. It should be noted that in steps 13S05 and 13S05a, besides sending the paging request to the access point apparatus 1308, the PLMN 1312 further sends the same paging request to other access point apparatuses (for example, the access point apparatus 1314) of the MVPN 110. However, in the present exemplary embodiment, only the access point apparatus 1318 receives the paging response of the mobile phone 1310 so that the access point apparatus 1314 which does not receive the paging response does not perform any response action. Below, the operation procedure of an access point apparatus corresponding to a MO user in the call setup method provided by the present exemplary embodiment will be described with reference to FIG. 14.

Figure 14:
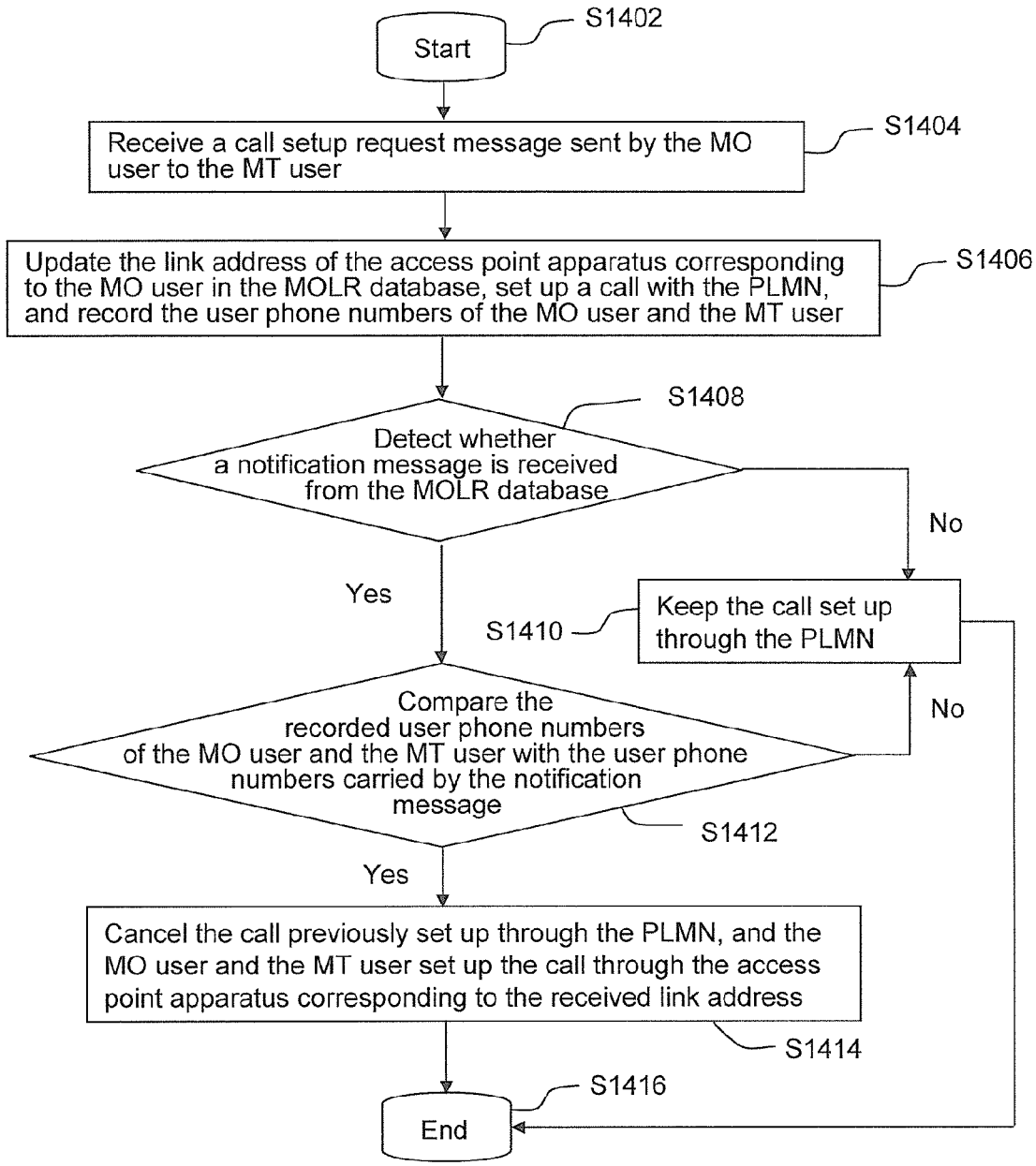
FIG. 14 is a flowchart illustrating the operation procedure of an access point apparatus corresponding to a MO user in the call setup method illustrated in FIG. 13 according to the third exemplary embodiment consistent with the present disclosure.

FIG. 14 is a flowchart illustrating the operation procedure of an access point apparatus corresponding to a MO user in the call setup method illustrated in FIG. 13 according to the third exemplary embodiment consistent with the present disclosure.

In step S1402, the operation procedure of the access point apparatus 1304 corresponding to the MO user starts.

In step S1404, the access point apparatus 1304 corresponding to the MO user receives a call setup request message sent by the MO user (the mobile phone 1302) to the MT user (the mobile phone 1310).

In step S1406, the access point apparatus 1304 updates the link address of the access point apparatus corresponding to the mobile phone 1302 in the MOLR database 1210, and meanwhile, the access point apparatus 1304 sets up a call with the PLMN 1312 and records the user phone number of the mobile phone 1302 and the user phone number of the mobile phone 1310.

In step S1408, the access point apparatus 1304 determines whether the user phone number of the mobile phone 1302, the user phone number of the mobile phone 1310, and the link address of the access point apparatus corresponding to the MT user are received from the MOLR database 1210. If foregoing information is not received, step S1410 is executed. If the user phone number of the MO user (the mobile phone 1302), the user phone number of the MT user (the mobile phone 1310), and the link address of the access point apparatus 1308 corresponding to the MT user are received from the MOLR database 1210, step S1412 is executed.

In step S1410, the access point apparatus 1304 continues to carry out the call setup procedure with the mobile phone 1310 through the PLMN 1312. Step S1416 is executed after step S1410.

In step S1412, the access point apparatus 1304 determines whether the user phone numbers of the MO user (the mobile phone 1302) and the MT user (the mobile phone 1310) received from the MOLR database 1210 are the same as the previously recorded user phone numbers of the MO user and the MT user. If the user phone numbers of the MO user (the mobile phone 1302) and the MT user (the mobile phone 1310) received from the MOLR database 1210 are the same as the previously recorded user phone numbers of the MO user and the MT user, step S1414 is executed. Otherwise, step S1410 is executed.

In step S1414, the access point apparatus 1304 cancels the call previously set up through the PLMN 1310 and the mobile phone 1310, and the mobile phone 1302 and the mobile phone 1310 set up the call through the corresponding access point apparatus 1304 and access point apparatus 1308.

In step S1416, the operation procedure of the access point apparatus 1304 corresponding to the MO user ends. Below, the operation procedure of an access point apparatus corresponding to a MT user in the call setup method provided by the present exemplary embodiment will be described with reference to FIG. 15.

Figure 15:
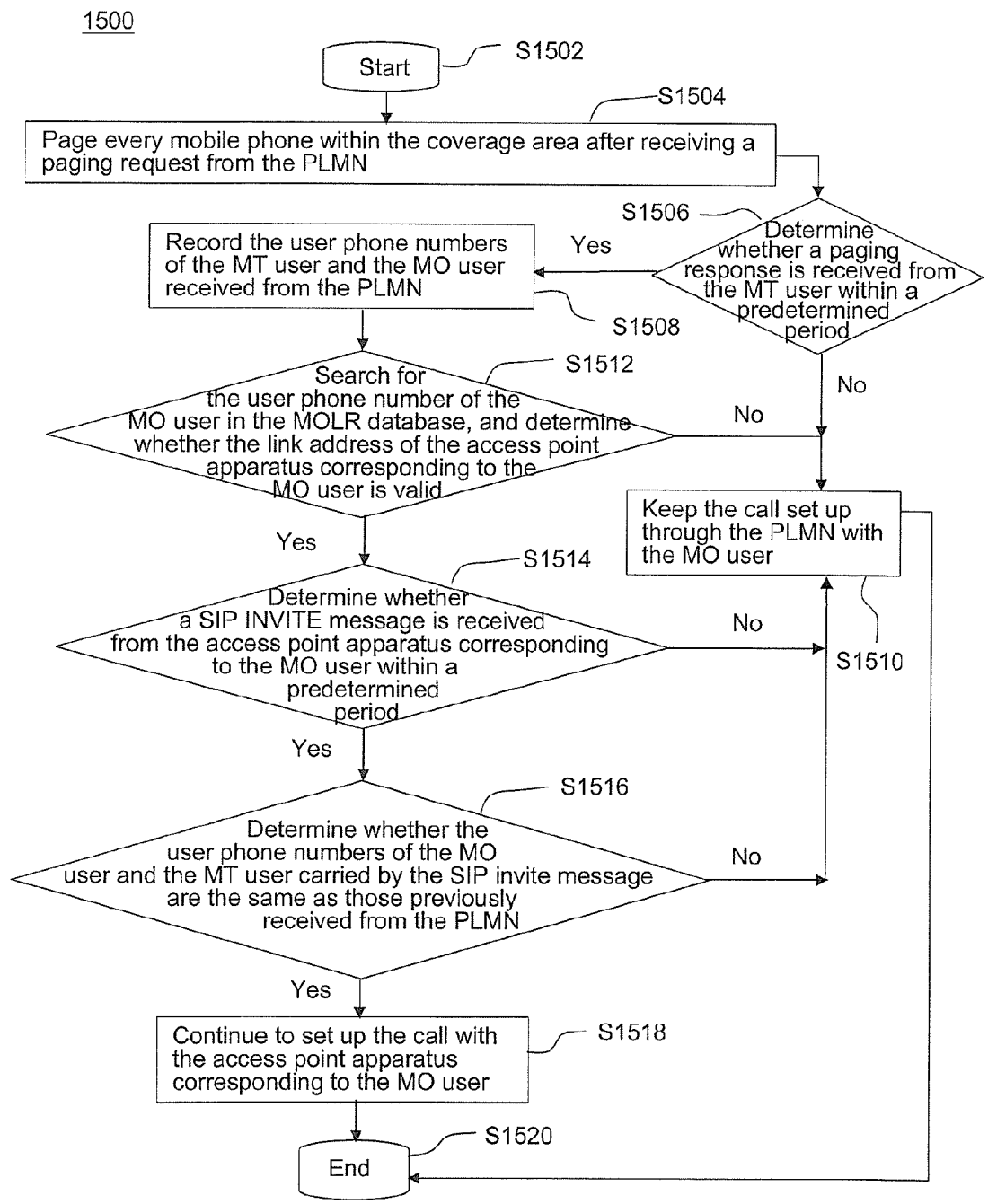
FIG. 15 is a flowchart illustrating the operation procedure of an access point apparatus corresponding to a MT user in the call setup method illustrated in FIG. 13 according to the third exemplary embodiment consistent with the present disclosure.

FIG. 15 is a flowchart illustrating the operation procedure of an access point apparatus corresponding to a MT user in the call setup method illustrated in FIG. 13 according to the third exemplary embodiment consistent with the present disclosure.

In step S1502, the operation procedure of the access point apparatus 1308 corresponding to the MT user starts. In step S1504, the access point apparatus 1308 receives a paging request from the PLMN 1310 and pages all the mobile phones currently within the coverage area of the access point apparatus 1308. Step S1506 is executed after step S1504.

In step S1506, the access point apparatus 1308 detects whether a paging response is received from the MT user (the mobile phone 1310) within a predetermined period. If a paging response is received from the MT user (the mobile phone 1310) within the predetermined period, step S1508 is executed. Otherwise, step S1510 is executed.

In step S1508, the access point apparatus 1308 records the user phone number of the MO user, the user phone number of the MT user, and the link address of the access point apparatus corresponding to the MO user carried by the paging request received from the PLMN 1312.

In step S1510, the access point apparatus 1308 continues to carry out the call setup procedure with the mobile phone 1310 through the PLMN 1312. Step S1520 is executed after step S1510.

In step S1512, the access point apparatus 1308 searches for the user phone number of the MO user (the mobile phone 1302) in the MOLR database 1306 and determines whether the link address of the access point apparatus corresponding to the MO user is valid. If the user phone number of the MO user (the mobile phone 1302) is found in the MOLR database 1306 and the link address of the access point apparatus corresponding to the MO user is valid, step S1514 is executed. Otherwise, step S1510 is executed.

In step S1514, the access point apparatus 1308 detects whether a SIP INVITE message is received from the access point apparatus 1304 corresponding to the MO user within a predetermined period, wherein the predetermined period may be 5 seconds. If the SIP INVITE message is received from the access point apparatus 1304 corresponding to the MO user within the predetermined period, step S1516 is executed after step S1514. Otherwise, step S1510 is executed after step S1514.

In step S1516, the access point apparatus 1308 determines whether a paging response message is received from the MT user within a predetermined period, wherein the predetermined period may be 5 seconds. If the paging response message is received from the MT user within the predetermined period, step S1518 is executed after step S1516. Otherwise, step S1510 is executed after step S1516.

In step S1518, the access point apparatus 1308 continues to set up the call with the access point apparatus 1304. Step S1520 is executed after step S1518. In step S1520, the operation procedure of the access point apparatus 1308 corresponding to the MT user ends.

As described above, different call setup methods adaptable to a MVPN and access point apparatuses using these methods are provided in exemplary embodiments consistent with the present disclosure, wherein the network resources of an enterprise are effectively used to resolve the problem of deficient indoor coverage and communication capacity of base stations of a mobile network provider without changing the existing structure and call setup procedure of the MVPN and the existing functions of mobile phones. In addition, the call setup methods and the access point apparatuses using the same provided by exemplary embodiments consistent with the present disclosure also reduce the resource cost of the mobile network provider and improve the performance and quality of call setup.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A call setup method, adaptable to a mobile virtual private network (MVPN), wherein the mobile virtual private network (MVPN) comprises a plurality of access point apparatuses, at least one database, and a plurality of users, the database records a private extension number, a user phone number, and a user identity module of each of the users and a link address of the corresponding access point apparatus, and the users comprise a mobile origination (MO) user and a mobile termination (MT) user, the call setup method comprising: receiving a call setup request message for setting up a call with the mobile termination (MT) user from the mobile origination (MO) user by using the access point apparatus corresponding to the mobile origination (MO) user; updating the link address of the access point apparatus corresponding to the mobile origination (MO) user in the database by using the access point apparatus corresponding to the mobile origination (MO) user; connecting to a public land mobile network (PLMN) by using the access point apparatus corresponding to the mobile origination (MO) user, and recording a user phone number of the mobile origination (MO) user and a user phone number of the mobile termination (MT) user; setting up the call through the public land mobile network (PLMN) by using the mobile origination (MO) user and the mobile termination (MT) user; if the access point apparatus corresponding to the mobile origination (MO) user receives the call setup request message from the public land mobile network (PLMN), determining whether the received user phone number of the mobile origination (MO) user and the received user phone number of the mobile termination (MT) user are the same as the recorded user phone number of the mobile origination (MO) user and the recorded user phone number of the mobile termination (MT) user; and if the received user phone number of the mobile origination (MO) user and the received user phone number of the mobile termination (MT) user are the same as the recorded user phone number of the mobile origination (MO) user and the recorded user phone number of the mobile termination (MT) user, cancelling the call set up through the public land mobile network (PLMN), and setting up the call through the access point apparatus corresponding to the mobile origination (MO) user and the access point apparatus corresponding to the mobile termination (MT) user by using the mobile origination (MO) user and the mobile termination (MT) user.

2. The call setup method according to claim 1 further comprising: receiving the user phone number of the MO user and the user phone number of the MT user from the PLMN by using the access point apparatus corresponding to the MT user; searching for the user phone number of the MO user in the database and determining whether the link address of the access point apparatus corresponding to the MO user is valid by using the access point apparatus corresponding to the MT user; and if the user phone number of the MO user is in the database and the link address of the access point apparatus corresponding to the MO user is valid, indicating to the database to send the user phone number of the MO user, the user phone number of the MT user, and the link address of the access point apparatus corresponding to the MT user to the access point apparatus corresponding to the MO user.

3. The call setup method according to claim 1 further comprising: if the access point apparatus corresponding to the MT user determines that the user phone number of the MO user is not in the database or the link address of the access point apparatus corresponding to the MO user is invalid, keeping the call set up through the PLMN.

4. The call setup method according to claim 1, wherein the link address of the access point apparatus corresponding to the user is set as invalid in the database after the user finishes the call.

5. The call setup method according to claim 1, wherein if the user turns off within a coverage area of the access point apparatus, the user performs a detach procedure on the database, and the database sets the link address of the access point apparatus corresponding to the user as invalid through the detach procedure.

6. The call setup method according to claim 1, wherein if the user does not turn off within the coverage area of the access point apparatus but the user leaves coverage areas of all the access point apparatuses of the MVPN, the user performs an update procedure on the database, and the database sets the link address of the access point apparatus corresponding to the user as invalid through the update procedure.

7. A mobile origination (MO) access point apparatus, adaptable to a mobile virtual private network (MVPN), wherein the mobile virtual private network (MVPN) comprises a mobile origination (MO) user, a mobile termination (MT) user, and a database, wherein the database records a private extension number, a user phone number, and a user identity module of the mobile origination (MO) user and a link address of the corresponding mobile origination (MO) access point apparatus, and the database also records a private extension number, a user phone number, and a user identity module of the mobile termination (MT) user and a link address of the corresponding mobile termination (MT) access point apparatus; the mobile origination (MO) access point apparatus receives a call setup request message for setting up a call with the mobile termination (MT) user from the mobile origination (MO) user; the mobile origination (MO) access point apparatus updates the mobile origination (MO) user and the link address of the corresponding mobile origination (MO) access point apparatus in the database; the mobile origination (MO) access point apparatus connects to a public land mobile network (PLMN) and records a user phone number of the mobile origination (MO) user and a user phone number of the mobile termination (MT) user; the mobile origination (MO) user and the mobile termination (MT) user set up the call through the public land mobile network (PLMN); if the mobile origination (MO) access point apparatus receives the call setup request message from the public land mobile network (PLMN), the mobile origination (MO) access point apparatus determines whether the received user phone number of the mobile origination (MO) user and the received user phone number of the mobile termination (MT) user are the same as the recorded user phone number of the mobile origination (MO) user and the recorded user phone number of the mobile termination (MT) user; and if the received user phone number of the mobile origination (MO) user and the received user phone number of the mobile termination (MT) user are the same as the recorded user phone number of the mobile origination (MO) user and the recorded user phone number of the mobile termination (MT) user, the mobile origination (MO) access point apparatus cancels the call set up through the PLMN, and the mobile origination (MO) user and the mobile termination (MT) user set up the call through the mobile origination (MO) access point apparatus and the mobile termination (MT) access point apparatus.

8. The MO access point apparatus according to claim 7, wherein the MO access point apparatus is the MT access point apparatus.

* * * * *